United States Patent [19]

Hattori et al.

[11] Patent Number: 5,274,424
[45] Date of Patent: Dec. 28, 1993

[54] IMAGE FORMING APPARATUS CONTROLLED ACCORDING TO SMALLEST NON-ZERO TONER DENSITY

[75] Inventors: Yoshihiro Hattori, Toyokawa; Hideaki Kodama, Okazaki; Suguru Hamamichi; Takeru Kinoshita, both of Toyokawa, all of Japan

[73] Assignee: Minolta Camera Kabushiki Kaisha, Osaka, Japan

[21] Appl. No.: 991,307

[22] Filed: Dec. 16, 1992

[30] Foreign Application Priority Data

Dec. 16, 1991 [JP] Japan ................................. 3-331771

[51] Int. Cl.⁵ ...................... G03G 15/00; G03G 15/01
[52] U.S. Cl. .................................. 355/208; 355/246; 358/500; 358/300
[58] Field of Search .............. 355/208, 214, 246, 326, 355/327; 358/75, 80, 300; 346/108, 157, 160

[56] References Cited

U.S. PATENT DOCUMENTS

| | | | |
|---|---|---|---|
| 4,226,525 | 10/1980 | Sakamoto et al. | 355/14 D |
| 4,277,162 | 7/1981 | Kasahara et al. | 355/14 R |
| 4,367,944 | 1/1983 | Kuru | 355/14 CH |
| 4,377,338 | 3/1983 | Ernst | 355/246 |
| 4,583,834 | 4/1986 | Seko et al. | 355/14 C |
| 4,647,950 | 3/1987 | Nosaki et al. | 346/160 |
| 4,679,057 | 7/1987 | Hamada | 346/76 L |
| 4,717,964 | 1/1988 | Abe et al. | 358/283 |
| 4,763,199 | 8/1988 | Suzuki | 358/280 |
| 4,800,442 | 1/1989 | Riseman et al. | 358/280 |
| 4,814,886 | 3/1989 | Kuge et al. | 358/293 |
| 4,816,924 | 3/1989 | Sekiya | 358/296 |
| 4,864,419 | 9/1989 | Saito et al. | 358/300 |
| 4,873,428 | 10/1989 | Takeuchi et al. | 250/214 DC |
| 4,888,636 | 12/1989 | Abe | 358/80 |
| 4,894,685 | 1/1990 | Shoji | 355/246 |
| 4,903,123 | 2/1990 | Kawamura et al. | 358/75 |
| 4,914,459 | 4/1990 | Mama et al. | 346/160 |
| 4,924,301 | 5/1990 | Surbrook | 358/75 |
| 4,933,776 | 6/1990 | Ikeda | 358/456 |
| 4,958,239 | 9/1990 | Yamada et al. | 358/457 |
| 5,148,289 | 9/1992 | Nishiyama et al. | 358/300 |
| 5,212,560 | 5/1993 | Hattori et al. | 358/300 |

FOREIGN PATENT DOCUMENTS

| | | |
|---|---|---|
| 51-33635 | 3/1976 | Japan . |
| 53-115233 | 10/1978 | Japan . |
| 54-141645 | 11/1979 | Japan . |
| 57-76977 | 5/1982 | Japan . |
| 59-140647 | 8/1984 | Japan . |
| 61-61566 | 3/1986 | Japan . |
| 61-94070 | 5/1986 | Japan . |
| 61-118069 | 6/1986 | Japan . |
| 61-214666 | 9/1986 | Japan . |
| 63-296062 | 12/1988 | Japan . |
| 5515169 | 2/1990 | Japan . |
| 2145598 | 3/1985 | United Kingdom . |

Primary Examiner—Joan H. Pendegrass
Attorney, Agent, or Firm—Burns, Doane, Swecker & Mathis

[57] ABSTRACT

In an image forming apparatus with use of electrophotographic process, a plurality of toner images are formed on a photoconductor by changing stepwise a predetermined operating parameter such as light intensity of laser beam or the grid potential of sensitizing charger, and the densities of the toner images are measured. Thus, the value of the operating parameter is determined which corresponds with the smallest non-zero toner density among the measured densities. When an image is formed on the photoconductor, for example the gamma table is corrected according to the determined minimum light intensity.

12 Claims, 25 Drawing Sheets

Fig. 11
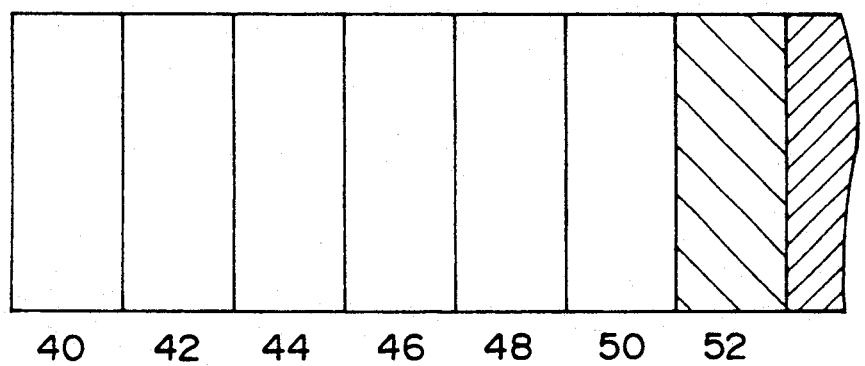
second series
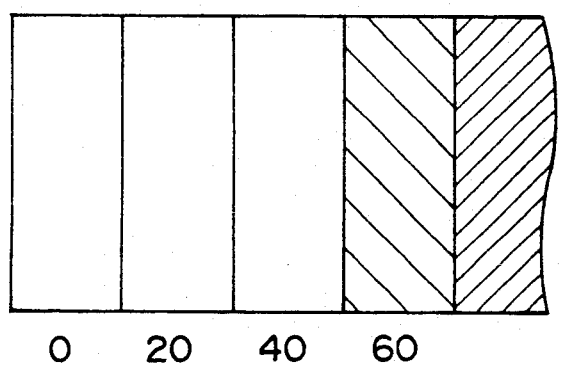
first series
← direction of rotation $V_{G1} > V_{G2} > V_{G3} > V_{G4}$ $V_{B1} < V_{B2} < V_{B3} < V_{B4}$

IMAGE FORMING APPARATUS CONTROLLED ACCORDING TO SMALLEST NON-ZERO TONER DENSITY

BACKGROUND OF THE INVENTION

1. Field of the Invention

The present invention relates to a digital image forming apparatus with use of electrophotographic process such as a digital printer or a digital copying machine.

2. Description of the Prior Art

In an image forming apparatus such as a laser printer, a laser diode is driven to expose a photoconductor according to digital image data converted from analog image signals and an image is reproduced with use of an electrophotographic process. Various digital image forming methods of exposing the photoconductor to reproduce a halftone image such as a photograph with a high fidelity are proposed for such an image forming apparatus.

Digital image forming methods includes an area gradation method with use of a dither matrix, a multi-value laser exposure method such as a pulse width modulation method or an intensity modulation method, and a multi-value dither method which combines the dither method with a pulse width modulation method or an intensity modulation method (refer for example Japanese Patent laid open Publications 62-91077/1987, 62-39972/1987, 62-188562/1987 and 61-22597/1987).

By using such a gradation method, the image density can be reproduced in principle in correspondence to the gradation of an image to be reproduced. However, the reproduced image density with a gradation method is not proportional correctly to the original image density due to the photosensitive characteristics of a photoconductor and the characteristics of toners. Then, the reproduced image density does not change linearly with the original image density and the resultant nonlinear characteristic is generally called as the gamma characteristic. The nonlinearity is a large factor which lowers the fidelity of the reproduced image of a half-tone document.

Then, the so-called gamma correction is conducted to improve the nonlinearity. That is, the document density read with a sensor is converted with a conversion table (called as gamma table) for the gamma correction and a digital image is formed according to the converted document density in order to realize the linear characteristics. By using such a gamma table, the image can be reproduced according to the document density level with a fidelity.

Further, there are other factors which affect the image density. The amount of adhered toners on the photoconductor on development changes according to the external environment of the photoconductor such as temperature or humidity owing to the characteristics of the photoconductor and the toners. That is, the transfer efficiency varies with the environment conditions. For example, in an environment of high temperature and high humidity, the adhered amount of toners increases, and the slope of the gamma characteristic at low and intermediate image densities is known to increase so as to make the reproduced image darker. On the other hand, in an environment of low temperature and low humidity, the adhered amount of toners decreases, and the slope of the gamma characteristic at low and intermediate image densities is known to decrease so as to make the reproduced image lighter.

As mentioned above, the density of a reproduced image varies also according to the environment. In order to solve this problem and to stabilize the reproduced image, the density is generally controlled so as to make the maximum density constant. In a conventional automatic density control, a standard toner image for the density control is first formed on the surface of the photoconductor, and the toner density of the standard toner image is measured by detecting the quantity of reflection light with a sensor arranged near the photoconductor. The grid potential of the sensitizing charger, the development bias potential of the development unit and/or the maximum light intensity of laser beam are changed according to the detected value by the sensor. Previously, the density control is performed by keeping the difference between the surface potential $V_0$ and the development bias potential $V_B$ constant in order to prevent a fog in the background of an image and to prevent the adhesion of carriers of two-component development material to the photoconductor. However, though such density control can make the maximum density constant, it is a problem that the gamma characteristic changes largely when the surface potential $V_0$ and the development bias potential $V_B$ are changed by keeping the difference between the surface potential $V_0$ and the development bias potential $V_B$ constant. In other words, the reproduced image does not have the same gradation characteristic.

Then, it is proposed to compare a grey scale obtained by copying a standard document with the standard grey scale itself for comparison to detect the optical densities of the two electrostatic latent images formed on a photoconductor. The correction amount of the toner density is calculated from the comparison of the two data, and the result is shown in a display so that a user can correct the dial setting for toner density (refer for example JP-A 141645/1979). Thus, the reproduced image can be kept to have the initial quality. However, the gradation is controlled indirectly in this method. Then, it is not guaranteed that a desired image can be obtained after the control. Further, the control cannot be performed in real time according to the changes of the copying process.

SUMMARY OF THE INVENTION

An object of the present invention is to provide a digital image forming apparatus with use of electrophotographic process which can adjust the gradation correction in real time according to the process conditions of image reproduction and can provide the constant gradation reproducibily.

In a digital image forming apparatus with use of electrophotographic process according to the present invention, a plurality of toner images are formed on a photoconductor by changing stepwise predetermined operating parameter such as light intensity of laser beam or the grid potential of sensitizing charge, and the densities of the toner images are measured. Thus, the value of the operating parameter is determined which corresponds with the smallest non-zero toner density among the measured densities. When an image is formed on the photoconductor, the image forming condition is controlled according to the determined operating parameter which is related to the gradation characteristic at low density region. For example, the gamma table may be corrected according to the determined minimum light intensity. The grid potential may be corrected according to the determined minimum grid potential.

An advantage of the present invention is that the gradation characteristic can be compensated directly irrespective of the changes of process conditions by measuring the minimum non-zero toner density.

BRIEF DESCRIPTION OF THE DRAWINGS

These and other objects and features of the present invention will become clear from the following description taken in conjunction with the preferred embodiments thereof with reference to the accompanying drawings, and in which:

FIG. 11 is a diagram of the measurement pattern formed on the photoconductor in order to detect the initial light quantity for image reproduction;

DETAILED DESCRIPTION OF THE PREFERRED EMBODIMENTS

Figure 1:
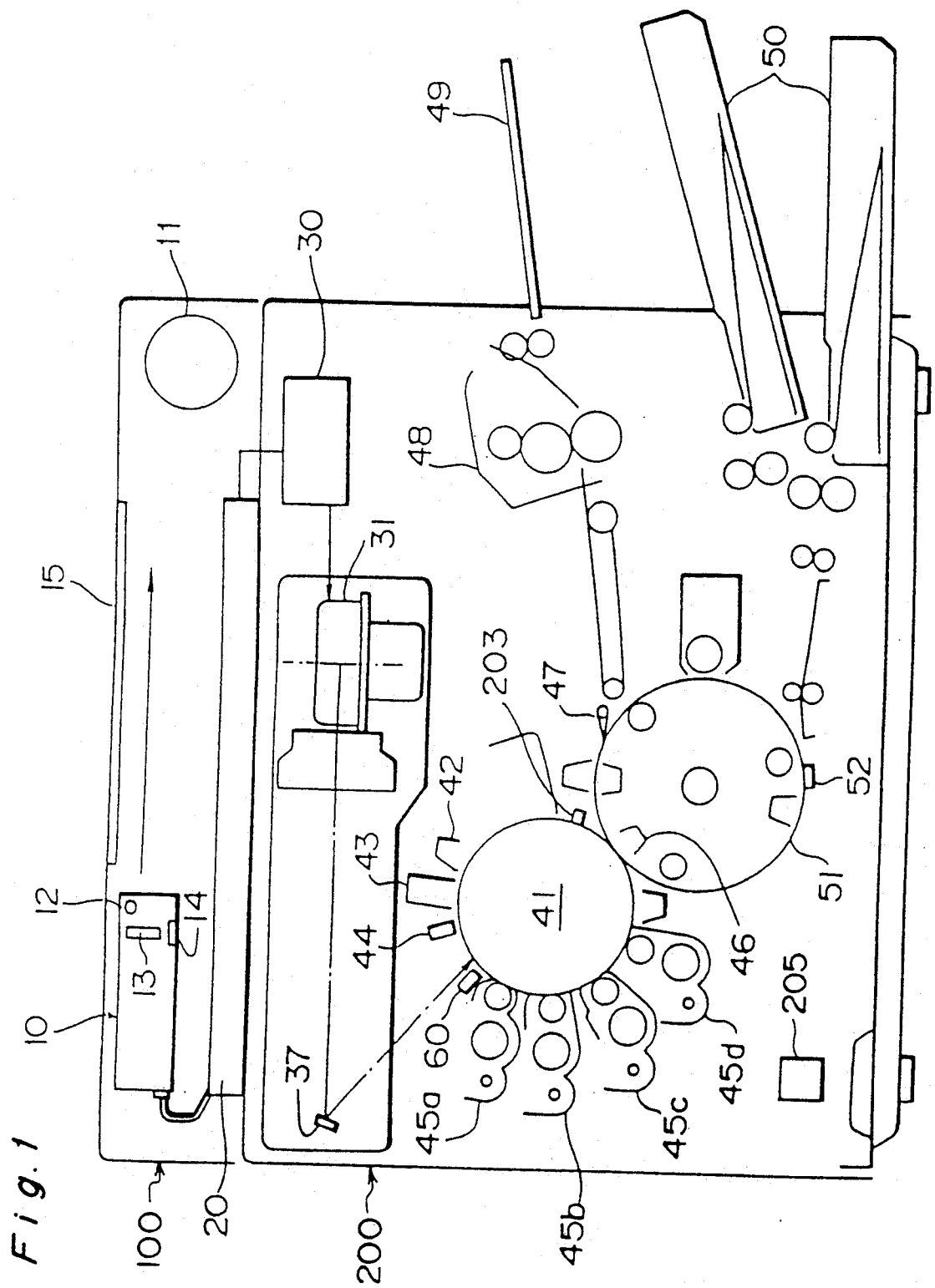
FIG. 1 is a sectional view of a full-color copying machine.

Referring now to the drawings, wherein like reference characters designate like or corresponding parts throughout the several views, preferred embodiments of the present invention will be explained below.

A digital color copying machine of an embodiment of the present invention will be explained below in the following order:
- (a) structure of digital color copying machine
- (b) image data processing
- (c) gradation correction and automatic density control in electrophotographic process of inversion development
- (d) gradation characteristic and initial light quantity for image reproduction
- (e) automatic density control
- (f) flow of printer control
- (g) modified embodiments (a) structure of digital color copying machine FIG. 1 shows a schematic structure of a digital color copying machine which consists mainly of an image reader 100 for reading a document image and a printer 200 for reproducing the document image.

In the image reader 100, a scanner 10 includes an exposure lamp 12, a rod lens array 13 to collect reflection light from a document put on a platen 15 and a contact type CCD color linear image sensor 14 to convert the collected light to an electric signal. The scanner 10 is driven by a motor 11 to move in the direction (subscan direction) of the arrow shown in FIG. 1. The optical image of the document illuminated by the exposure lamp 12 is converted by the image sensor 14 into multi-level electric signals of red (R), green (G) and blue (B). The electric signals are converted by an image signal processor 20 to 8-bit gradation data of yellow (Y), magenta (M), cyan (C) or black (K), which are stored in a buffer memory 30 for synchronization.

Then, in the printer 200, a print head 31 performs the gradation correction (gamma correction) of the receive gradation data and it converts the corrected image data to a drive signal to drive a laser diode 264 (refer FIG. 3) in the print head 31.

A laser beam emitted from the print head 31 exposes a photoconductor drum 41 driven to be rotated, via a reflection mirror 37. The photoconductor drum 41 has been illuminated by an eraser lamp 42 and has been sensitized uniformly by a sensitizing charger 43 for each copy before the exposure. When the exposure is performed onto the photoconductor in the uniformly charged state, an electrostatic latent image is formed on the photoconductor drum 41. Then, one of development units 45a-45d of yellow, magenta, cyan and black toners is activated to develop the latent image. The developed image is transferred by a transfer charger 46 to a paper wound on a transfer drum 51.

The above-mentioned printing process is repeated four times for yellow, magenta, cyan and black. At this time, the scanner 10 repeats the scanning in synchronization with the motion of the photoconductor drum 41 and the transfer drum 51. Then, the paper is isolated from the transfer drum 51 with the operation of a claw 47, the image is fixed by a fixer 48 and the paper is carried out to a paper tray 49. In this process, a paper is supplied from a paper cassette 50 and is chucked at the top of the paper by a chucking mechanism 52 on the transfer drum 51 in order to prevent a shift of position on the image transfer.

Figure 2:
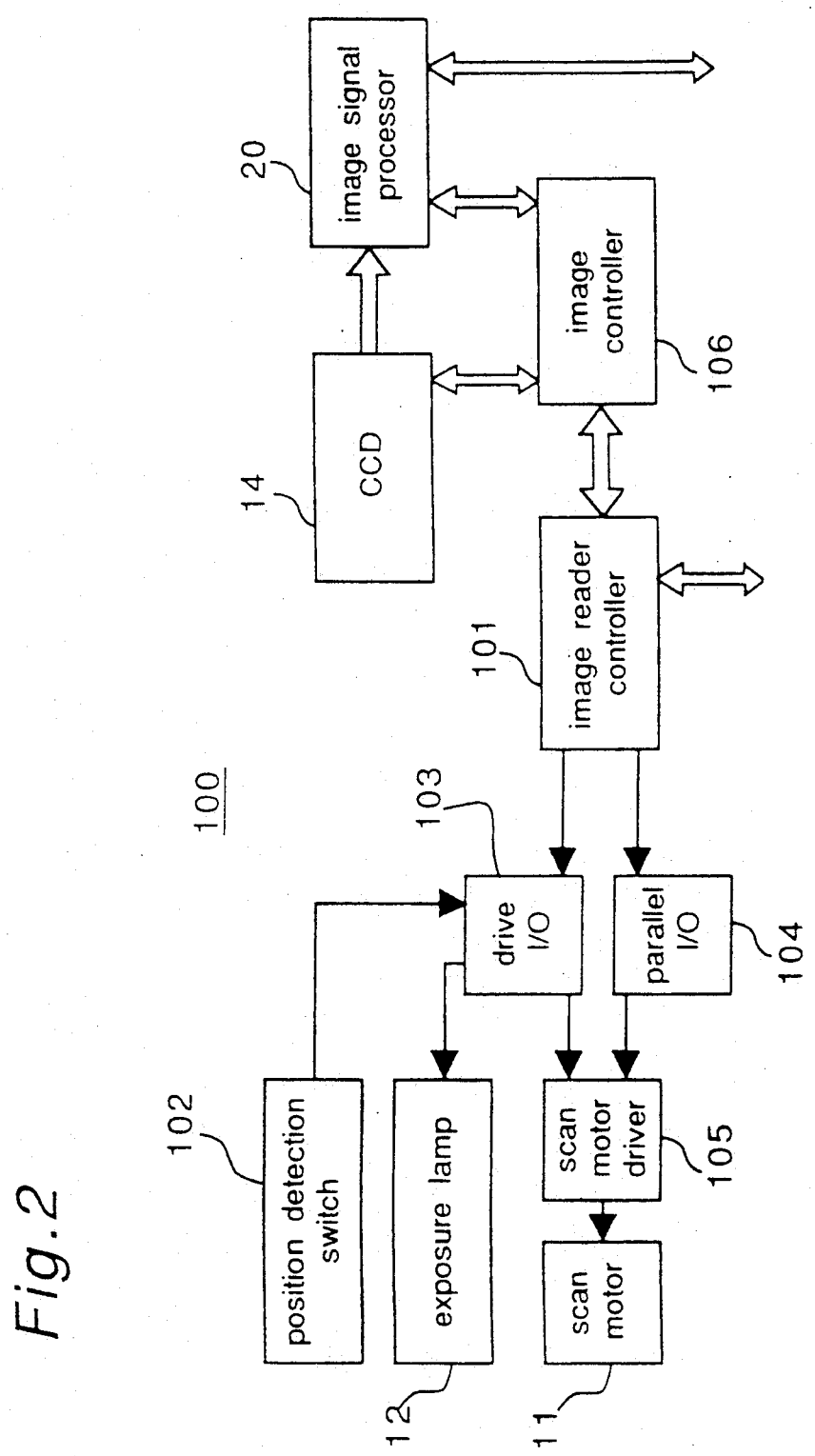
FIG. 2 is a block diagram of the control system of the image reader of the copying machine.
Figure 3:
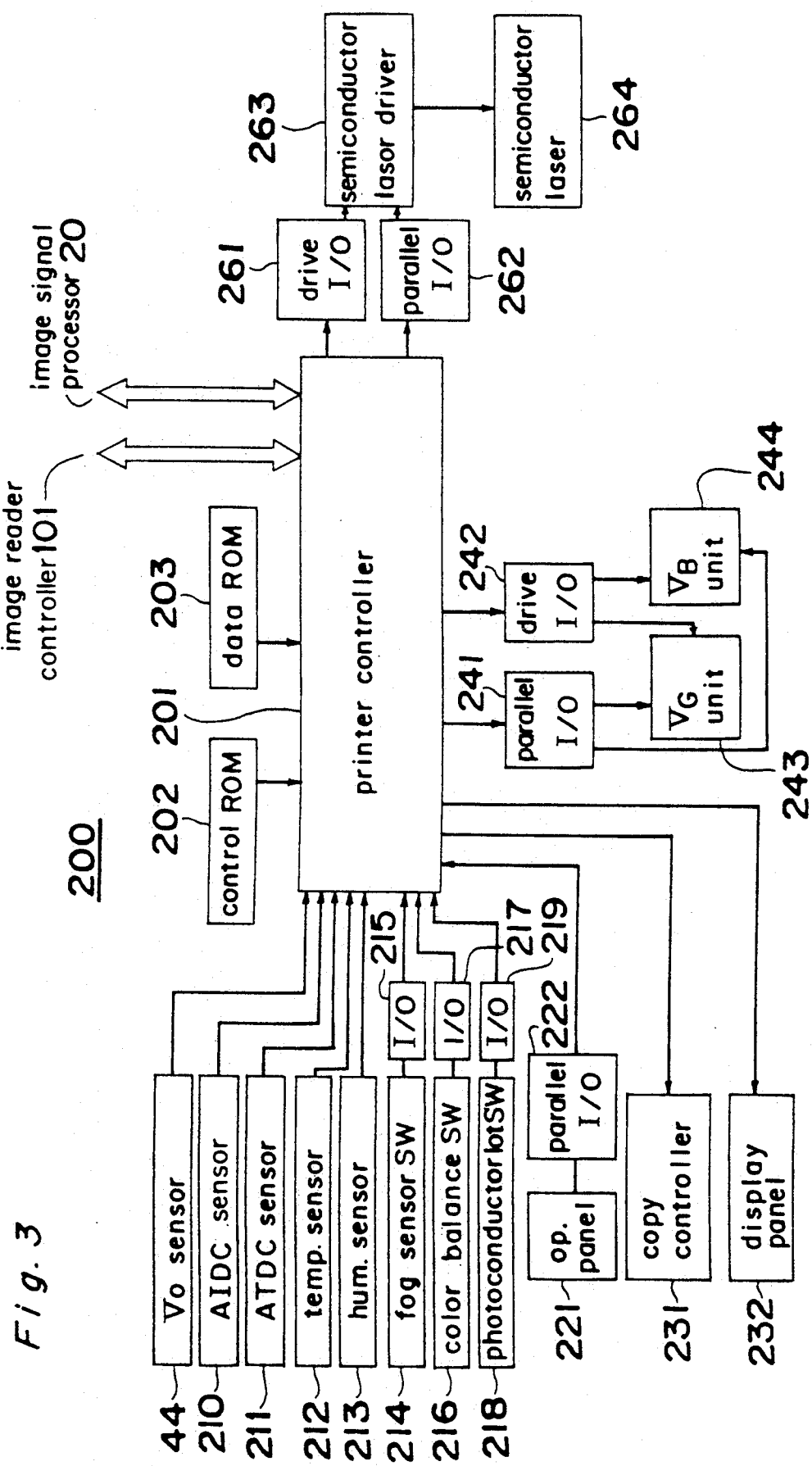
FIG. 3 is a block diagram of the control system of the printer of the copying machine.

FIGS. 2 and 3 show a whole block diagram of the control system of the digital color copying machine of FIG. 1. The image reader 100 is controlled by an image reader controller 101. The controller 101 controls the exposure lamp 12 via a drive I/O 103 according to a position signal from a position detection switch 102 which indicates the position of a document on the platen 15 and controls a scan motor driver 105 via a drive I/O interface 103 and a parallel I/O interface 104. The scan motor 11 is driven by the scan motor driver 105.

On the other hand, the image reader controller 101 is connected via a bus to an image controller 106. The image controller 106 is connected to the CCD color image sensor 14 and the image signal processor 20. The image signal from the CCD color image sensor 14 is processed by the image signal processor 20.

FIG. 3 shows a block diagram of a printer control system of the printer 200. The printer 200 includes a printer controller 201 for controlling the copying action. The printer controller 201 is connected to a control ROM 202 storing a control program and a data ROM 203 storing various data such as the gamma correction tables. The printer controller 201 controls a copy controller 231 and the display panel 232 according to the data received from the operational panel 221 and the data ROM 203 under the contents of the control ROM 202.

The printer controller 201 receives analog signals from various sensors which include the $V_0$ sensor 44 to detect the surface potential $V_0$ of the photoconductor drum 41, the AIDC sensor 210 to detect the amount of adhered toners, ATDC sensors 211 to detect the toner density in the development units 45a–45d, a temperature sensor 212 and a humidity sensor 213. The printer controller 201 is also connected via I/Os 215, 217 and 219 to a 2-bit fog input switch 214 for setting the fog remove level, to four 4-bit color balance switches 216 for setting the color balance level of each color and to a 3-bit photoconductor lot switch 218, respectively. The fog input value is set by a service man or by a user with a DIP switch. However, it may also be input with an operational panel 221.

In FIG. 3, the printer controller 201 controls the print controller 231 and the display panel 232 according to the data of the sensors 44, 210–213, the operational panel 221, the input switches 214, 126 and 218 and the data ROM 203. Further, the printer controller 201 controls a high voltage unit 243 for generating the grid voltage $V_G$ of the discharge electrode of the sensitizing charger 43 and a high voltage unit 244 for generating the bias voltage $V_B$ of the development unit 45a–45d via a parallel I/O 241 and a drive I/O 242.

The print head controller 202 is connected to the image signal processor 202 of the image reader 100 via an image bus and performs the gamma correction on the basis of the image signal received via the image data bus with reference to a gamma correction table stored in the data ROM 203. Then, the print head controller 202 controls the semiconductor laser controller 263 via the drive I/O 261 and a parallel I/O 262, and the semiconductor laser controller 263 controls the emitting of the semiconductor laser 264. Further, the printer controller 101 is synchronized with the image signal processor 20 to each other via the buses.

(b) image signal processing

Figure 4:
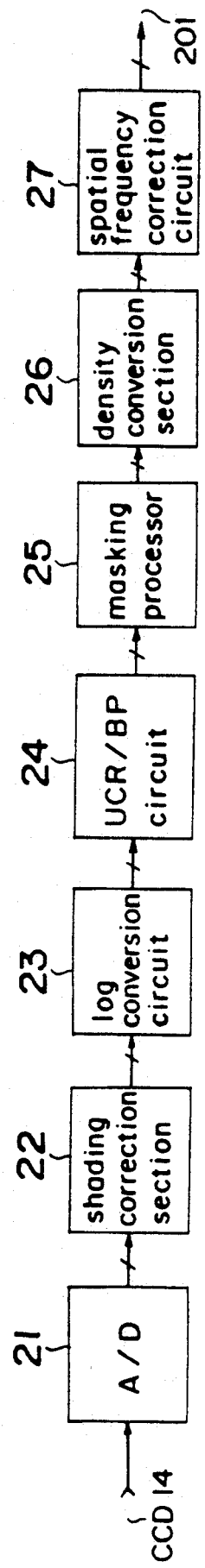
FIG. 4 is a block diagram of an image signal processor.

As shown in FIG. 4 of the image data processor 20, the output image received from the CCD color image sensor 14 is processed to send gradation data. The analog image signal received from the CCD color image sensor 14 is converted to multi-level digital image data of R, G, B by an A/D converter 21. The converted image data is subjected to the shading correction in the shading correction circuit 22. The data corrected in the shading correction circuit 22 is data of reflection light from a document, and it is converted logarithmically to the density data of an actual image in a logarithmic conversion circuit 23. An under color remove/black paint circuit 24 removes excess black and generates a true black data K from the R, G, B data. In a masking circuit 25, the data R, G, B of three colors are converted to data Y, M, C of cyan, magenta and yellow. The Y, M, C data are multiplied with prescribed coefficients for density correction in a density correction circuit 26. Then, the spatial frequency correction processing is performed in a spatial frequency correction circuit 27 and the resultant data are sent to the printer controller 201.

Figure 5:
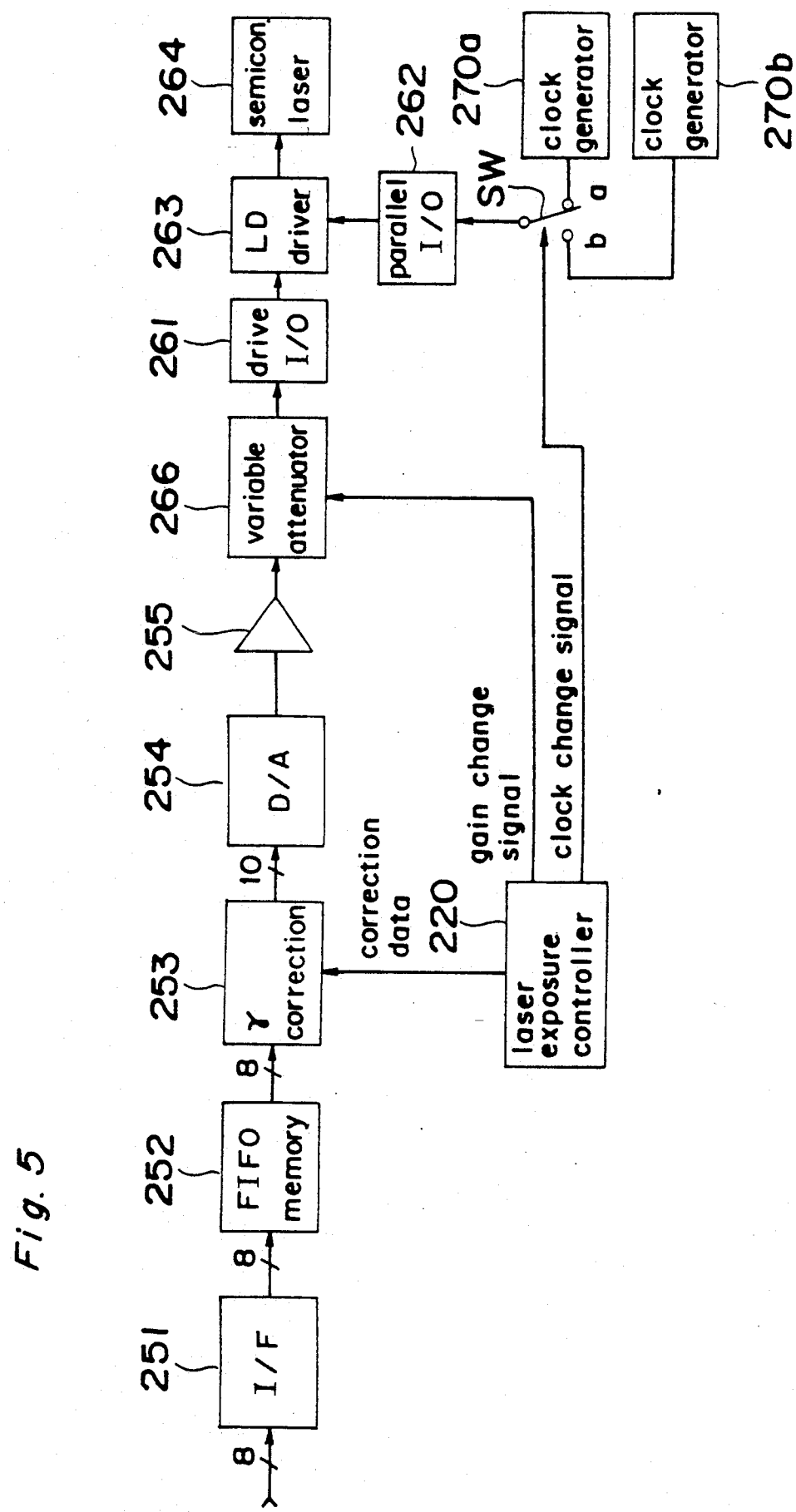
FIG. 5 is a block diagram of image data process system of the printer controller.

FIG. 5 shows image data processing in the printer controller 201. Image data are received through a interface 251 from the image signal processor 20 and are stored in a first-in first-out (FIFO) memory 252. The FIFO memory 252 is a line buffer memory which can store gradation data of a prescribed line number in the main scan direction and it buffers the difference of the clock frequencies between the image reader 10 and the printer 200. The data in the FIFO memory 252 are input to a gamma correction section 253. Gamma correction data stored in the data ROM 203 and selected as explained below are received from the laser exposure controller 220, and the gamma correction section corrects the input data (ID) to send an output level to a D/A converter 254.

The D/A converter 254 converts the digital input data to an analog voltage, which is sent through an amplifier 255, a variable attenuator 266, the drive I/O 162 and the laser diode (LD) driver 263 to the laser diode 264 which emits a light of an intensity in correspondence to the digital data. The attenuation in the variable attenuator 266 can be changed at eight steps so as to adjust the power of the laser beam.

Further, clock generators 270a and 270b generate clock signals of different clock frequency to each other. Each clock signal is output via an "a" side or "b" side of a switch SW to the semiconductor laser (LD) driver 263. The switch SW is changed according to a clock switch signal output by the laser exposure controller 220 to select the clock signals for the semiconductor laser driver 263.

Figure 6:
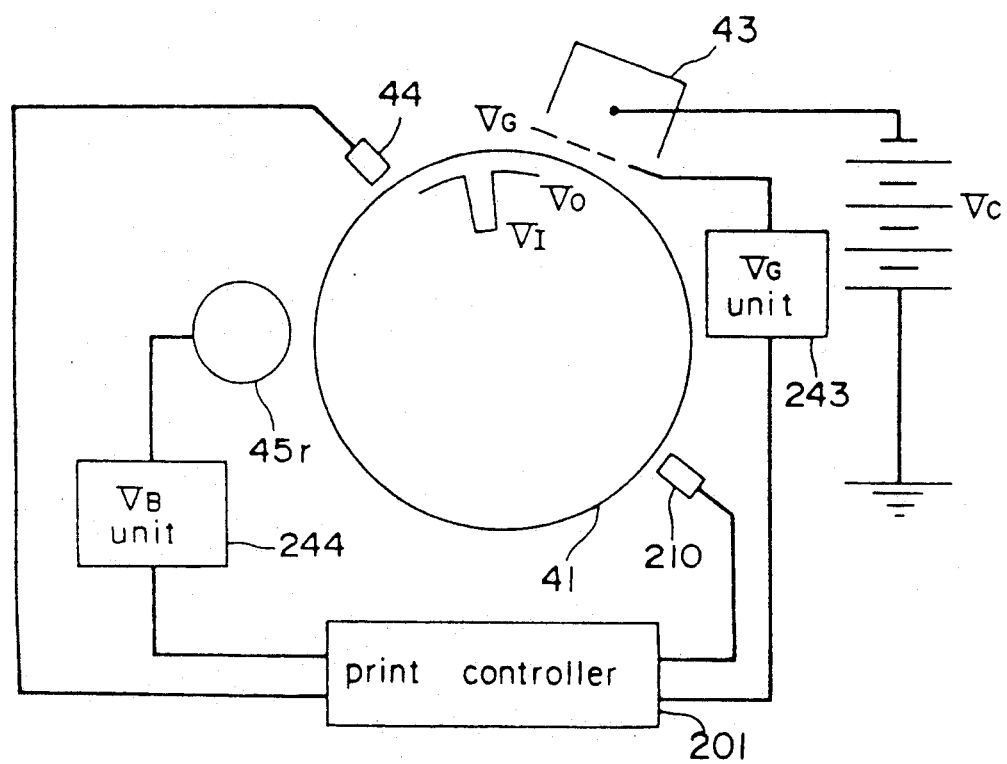
FIG. 6 is a schematic diagram of image forming section including a photoconductor drum and a development unit.

(c) automatic density control and gradation correction in electrophotographic process of inversion development The image-forming control is explained below with reference to FIG. 6 of a schematic diagram of image forming section including the photoconductor drum 41, a grid of the sensitizing charger 43 and a roller of the development unit 45r. As shown in FIG. 6, the sensitizing charger 43 of grid potential (discharge potential) $V_G$ is arranged opposite to the photoconductor 41. The negative grid potential $V_G$ is supplied to the grid of the charger 43 by the grid potential generator 243. The surface potential $V_0$ of the photoconductor just after the sensitization by the charger 43 before the exposure can be taken almost equal to the grid potential $V_G$. Therefore, the surface potential $V_0$ can be controlled by the grid potential $V_G$. The surface potential $V_0$ is detected by the $V_0$ sensor 44 which is an electrometer.

In the image-forming for copy, a negative surface potential $V_0$ is applied to the photoconductor drum 41 by the sensitizing charger 43 before the exposure of laser beam onto the photoconductor 41, while a negative, lower bias voltage $V_B$ ($|V_B| < |V_0|$) is applied to the roller of the development unit 45r by the high voltage unit 244. That is, the surface potential of the development sleeve or the potential of toners in the development unit is equal to be $V_B$. When the laser beam exposes the photoconductor sensitized uniformly, the potential at the exposure position decreases from the surface potential $V_0$ to an attenuation potential $V_I$ of the electrostatic latent image. If the attenuation potential $V_I$ becomes lower than the development bias potential $V_B$, the toners carried to the surface of the sleeve of the development unit 45r adhere to the photoconductor drum 41.

It is not good that the difference between the surface potential $V_0$ and the development bias potential $V_B$ is too large or too small. Further, the adhered amount of toners increases with increasing development voltage $\Delta V = |V_B - V_I|$. On the other hand, the attenuation potential $V_I$ changes with the surface potential $V_0$ even under the same exposure light quantity. Then, for example, the surface potential $V_0$ and the development bias potential $V_B$ are changed by keeping the difference between the surface potential $V_0$ and the development bias potential $V_B$ constant. By changing the difference between the development bias potential $V_B$ and the attenuation potential $V_I$, the adhered amount of toners can be changed to control the density.

Figure 7:
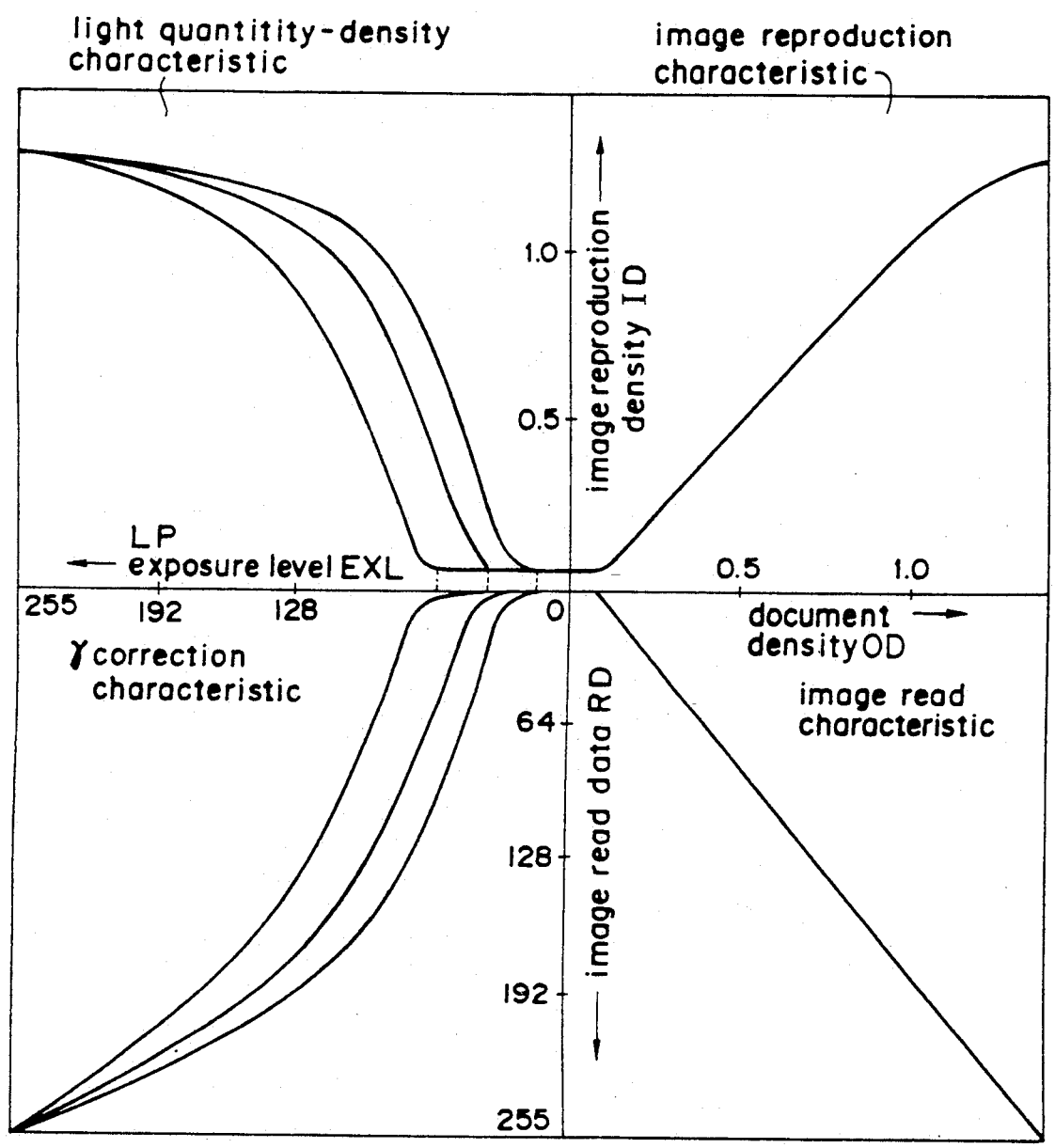
FIG. 7 is a graph of the sensitometry of color copying machine.

FIG. 7 shows a graph of the sensitometry of image forming. The sensitometry includes a light quantity-density characteristic, an image reproduction characteristic, a gamma correction characteristic and an image read characteristic. In FIG. 7, the image reproduction density ID is represented as the absolute density added with the density IDu of the background. (The reflection density of a white plate of calcium carbonate is set to be zero.) Though only three gamma tables T are shown in FIG. 7 for simplicity, sixteen gamma tables T0–T15 are prepared in the ROM 203.

The characteristics shown in FIG. 7 are affected by the sensitivity of the photoconductor, the environment around the photoconductor or the like. Previously, the toner density of a standard toner image is measured, and the maximum light quantity on exposure, the grid potential $V_G$ and/or the bias potential $V_B$ are determined according to the measured toner density and other factors such as the humidity of the photoconductor. The gradation characteristic is also adjusted by changing the gamma table, $V_G$, $V_B$ and the like according to the measured toner density. However, the gradation characteristic is affected largely by the changes in $V_G$ and $V_B$. The gradation characteristic is especially nonlinear at low densities above the initial light quantity defined below. Then, in the present embodiment, the density of the standard toner image is measured as usual in order to determine the maximum light quantity and the like (refer Table 2), while the gradation characteristic is determined according to the initial light quantity "a" which is defined as a light quantity at which toners begin to adhere to the photoconductor when the exposure level EXL is increased (refer Table 1). In other words, the initial light quantity "a" is measured directly in the present embodiment. Thus, the change in the half-tone reproducibility due to the changes of image-forming process can be compensated.

In the automatic density control, one standard toner image is formed on the surface of the photoconductor drum 41, and the image reproduction density of the standard toner image is measured by detecting the quantity of reflection light with the AIDC sensor 210 arranged near the photoconductor drum 41, and it is used to determine the $V_G$ and $V_B$ according to the level as shown in Table 2.

Figure 8:
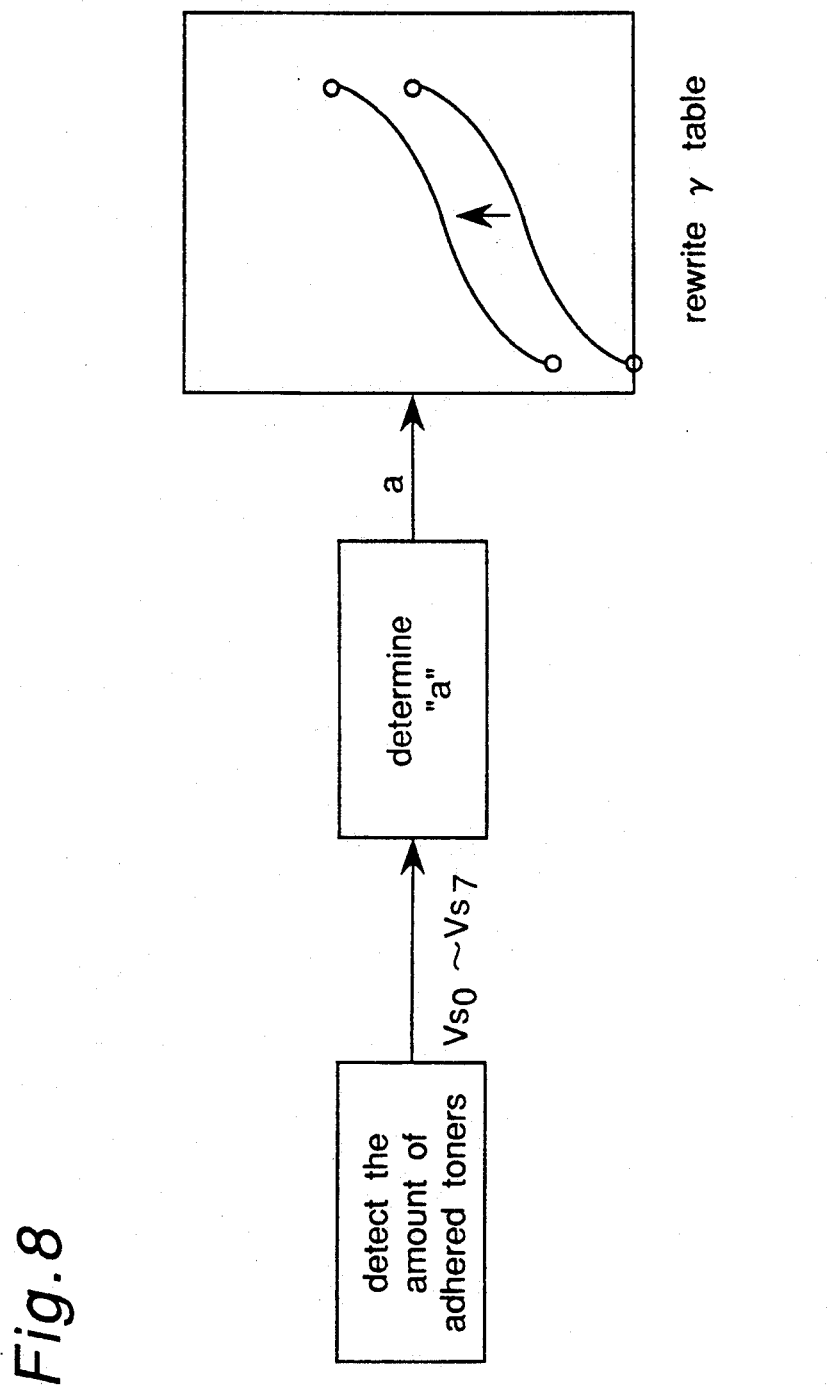
FIG. 8 is a diagram for illustrating the detection of the initial light quantity for image reproduction and the correction of gamma table.

In the measurement of the initial light quantity, toner images are formed successively with increasing the light quantity of laser beam on the surface of the photoconductor drum 41. In the formation of the toner images, the image-forming conditions of $V_G$, $V_B$ and the like determined before this measurement are used. That is, the images are formed in the same conditions of the image forming of document images. Then, the image reproduction densities of the toner images are measured by detecting the quantity of reflection light with the AIDC sensor 210 arranged near the photoconductor drum 41, and the initial light quantity is determined. It is used to determine the gradation characteristic according to the level as shown in Table 1 or the gamma table is written according to the determination. This sequence is shown in FIG. 8.

(d) Initial light quantity and the gradation characteristic

The gamma correction is conducted by using one of gamma tables T0–T15, as shown in Table 1, selected according to the detected initial light quantity "a" for image reproduction. That is, the sixteen gamma correction tables T0–T15 are stored in the data ROM 203 beforehand in correspondence to the initial light quantity. The measurement of the initial light quantity "a" is explained below in detail.

TABLE 1

| initial light quantity (a) | gamma table |
|---|---|
| a ≦ 25 | T0 |
| 25 < a ≦ 28 | T1 |
| 28 < a ≦ 31 | T2 |
| 31 < a ≦ 34 | T3 |
| 34 < a ≦ 37 | T4 |
| 37 < a ≦ 40 | T5 |
| 40 < a ≦ 43 | T6 |
| 43 < a ≦ 46 | T7 |
| 46 < a ≦ 49 | T8 |
| 49 < a ≦ 52 | T9 |
| 52 < a ≦ 55 | T10 |
| 55 < a ≦ 58 | T11 |
| 58 < a ≦ 61 | T12 |
| 61 < a ≦ 64 | T13 |
| 64 < a ≦ 67 | T14 |
| 67 < a | T15 |

In the measurement of the initial light quantity for image reproduction, first, patterns of electrostatic latent images are formed successively with increase in the light quantity of laser beam on the photoconductor drum 41.

Figure 9:
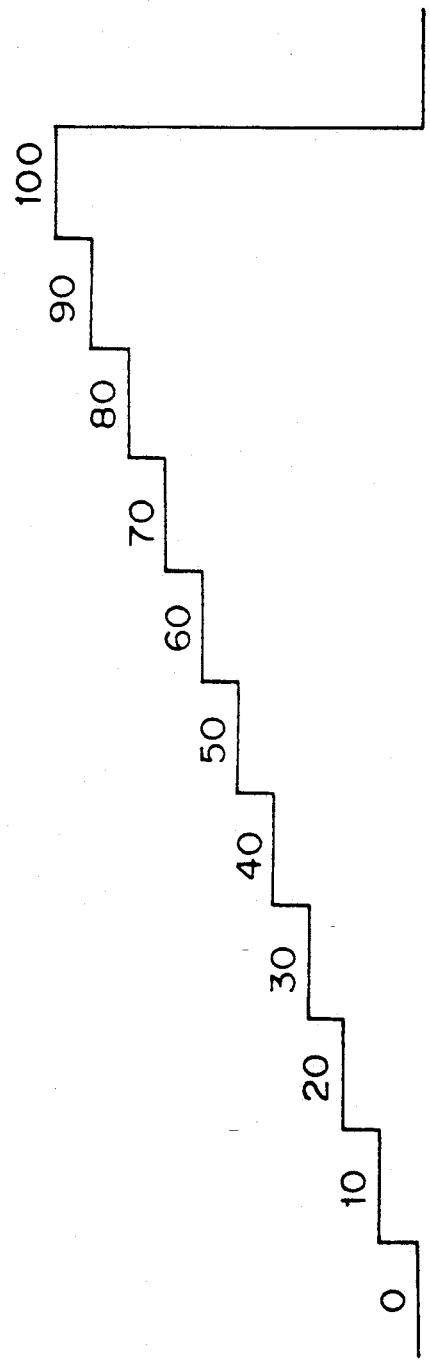
FIG. 9 is a diagram for illustrating an example of a method of increasing the exposure level.

The successive increase in exposure light quantity may be performed in any of the following three procedures:

(d1-a) The exposure light quantity level EXL is increased at an equal interval, say by 10 levels from the minimum level 0 to the maximum level 100, as shown in FIG. 9. This procedure has a simple sequence and is carried out fast. However, it has a low precision.

Figure 10:
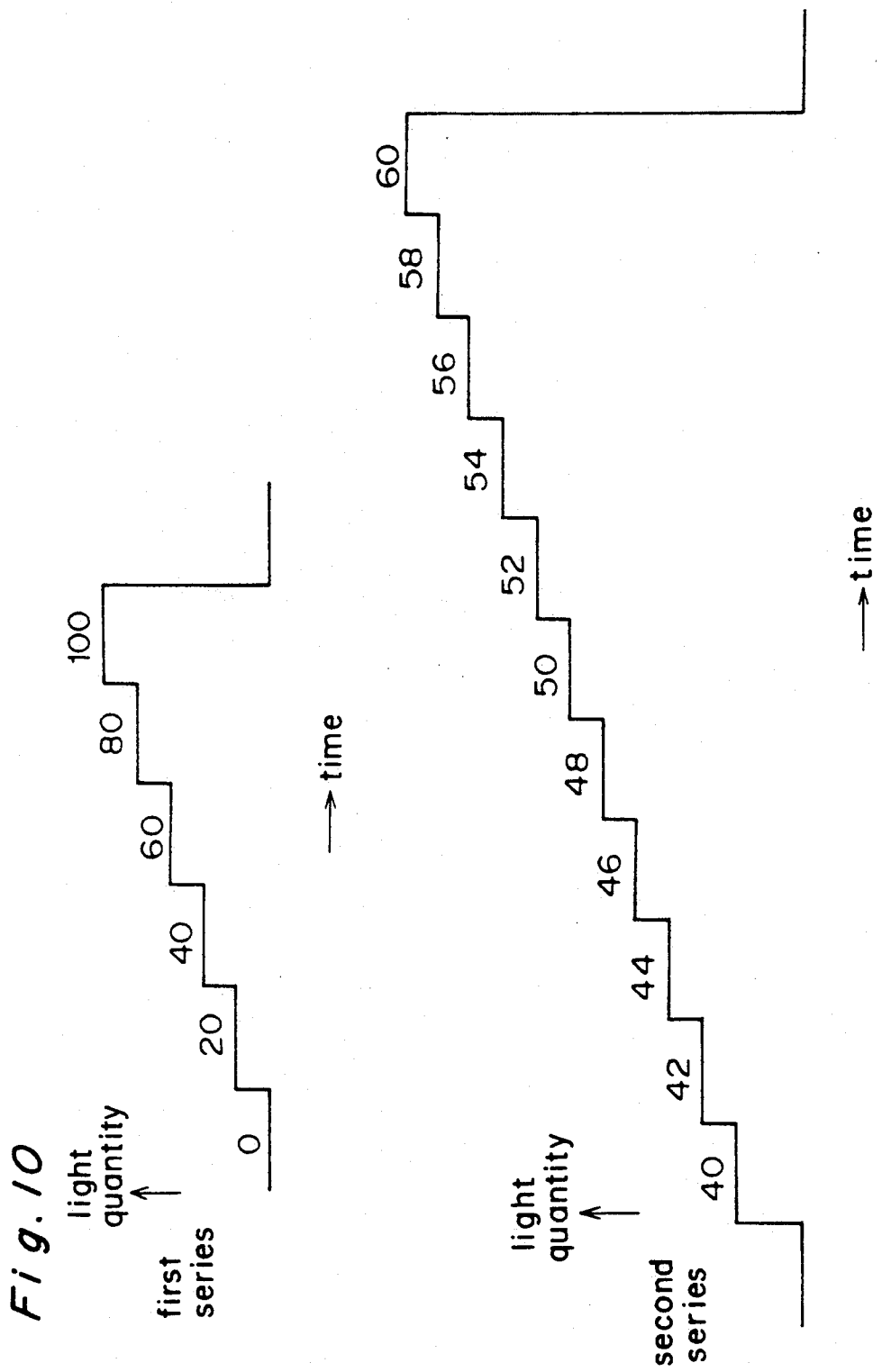
FIG. 10 is a diagram for illustrating another example of a method of increasing the exposure level.

(d1-b) The exposure light quantity level is increased at first roughly, say by 20 levels in the first series, and then finely in the second series, say by 2 levels, around the initial light quantity detected in the first series. In an example shown in FIG. 10, the toner density is detected first in the first series when the light quantity level is 60. Therefore, the initial light quantity will be near and below 60. Then, in the second series, the exposure light quantity level is increased successively from 40 to 60 by 2 levels. This procedure can be carried out relatively fast, while its precision is high.

FIG. 11 shows measurement patterns formed on the photoconductor drum 41. In FIG. 11, slant lines are used to designate the density of adhered toners. In the first series, the exposure light quantity is increased by 20 levels successively, and it is observed that the initial light quantity for image reproduction lies between the levels 40 and 60. Then, in the second series, it is determined that the initial light quantity level is 52.

Figure 12:
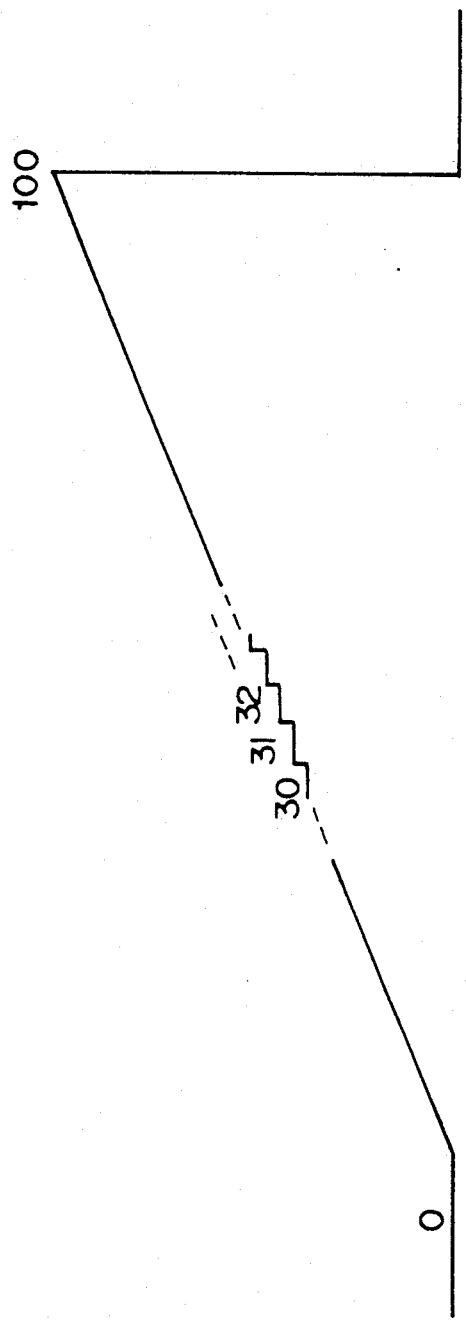
FIG. 12 is a diagram for illustrating a still another example of a method of increasing the exposure level.

(d1-c) The exposure light quantity is increased continuously by 1 level, as shown in FIG. 12. This procedure has a high precision though it takes a long time.

Second, the toner densities of the patterns are read after development with the AIDC sensor 210. The reading may be carried out with either of the following two procedures:

(d2-a) The densities of the toner images are read with the AIDC sensor 210 and stored as $V_S(1)$, $V_S(2)$, ..., $V_S(n)$ after a time $T_1$ passes required for the patterns to move from the exposure position to the read position on the photoconductor.

Figure 13:
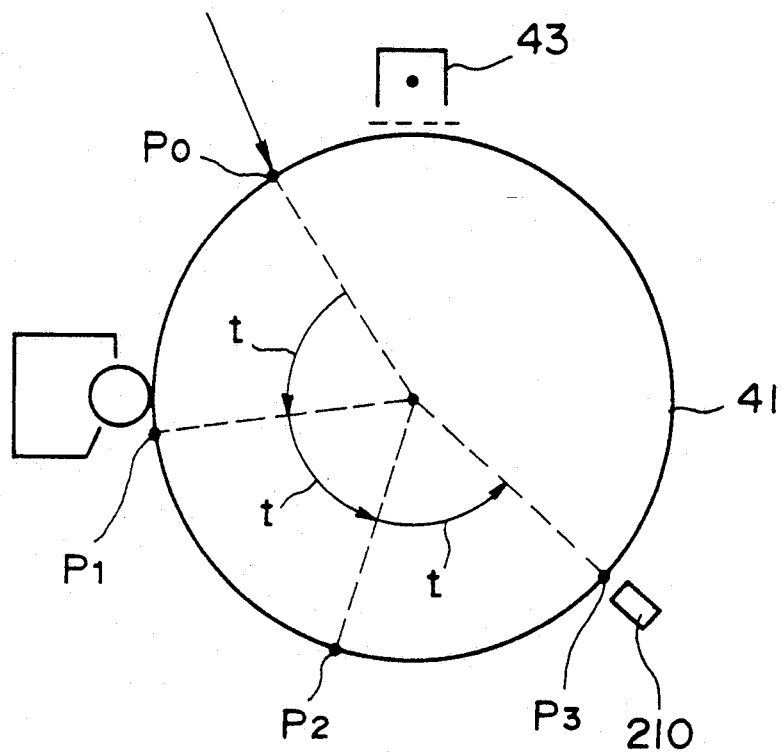
FIG. 13 is a diagram for illustrating the relation of the exposure position with the detection position of adhered toner amount on the photoconductor.

FIG. 13 displays schematically the exposure position $P_0$ on the photoconductor drum 41, the detection position $P_3$ for the AIDC sensor 210 and positions $P_1$ and $P_2$ obtained by dividing the arc $P_0$–$P_3$ into three equal parts. In the measurement of the initial light quantity, a pattern exposed at the point $P_0$ at the first exposure level is moved to the point $P_1$ after a time "t" passes, and the exposure is carried out again at the point $P_0$ at the second exposure level. The pattern exposed at the first exposure level reaches the point $P_3$ after a time "3t" passes and the density of the pattern is detected by the AIDC sensor 210.

(d2-b) First, the ground level $V_{S0}$ is read in order to determine a threshold level $V_{SS} = V_{S0} + \Delta V_S$ where $\Delta V_S$ denotes a prescribed development voltage shown in Table 2. Next, the densities of the toner images are read successively, and when the output $V_S$ of the AIDC sensor 210 exceeds the threshold level $V_{SS}$, the light quantity level is determined according the time $T_2$ elapsed after the passage of $T_1$.

The output $V_S$ of the AIDC sensor 210 includes noises for example due to the edge effects at the leading and trailing edges of the patterns, to the nonuniformity of the density in the pattern and to the change in the distance between the sensor and the photoconductor. The noises due to the edge effect can be eliminated by increasing the pattern area or by using a timer so as not to measure the patterns around the edges. Further, the noises due to the change in the distance can be removed by measuring the ground level before forming the patterns to correct the read values of the patterns with the ground level data.

Finally, the initial light quantity "a" for image reproduction is determined from the measured data of the toner density. Either of the following three procedures can be used:

(d3-a) The light quantity $I_S$ is obtained at which d data $V_S$ exceeds the threshold level $V_{SS} = V_{S0} + dV_S$. Then, the initial light quantity is defined as $I_S - I_d$ wherein $I_d$ is a predetermined light quantity. This procedure is simple and has a high precision when the change amount in exposure light quantity is small.

(d3-b) The sensor output $V_S$ for the light quantity level $I_0$ determined as (d3-a) is corrected further as explained below by using the sensor outputs $V_{IS0}$ and $V_{IS1}$ for the light quantity levels $I_{S0}$ and $I_{S1}$ just before and after $I_0$ and by solving the following simultaneous equations (1):

$$V_{IS0} = a\ I_{S0}^2 + b\ I_{S0} + c,$$

$$V_{IS} = a\ I_S^2 + b\ I_S + c, \tag{1}$$

and $$V_{IS1} = a\ I_{S1}^2 + b\ I_{S1} + c.$$

Then, the light quantity $I_{SS}$ for the threshold level $V_{SS}$ is calculated with interpolation to obtain the light quantity $I_{SS}$ with use of the following equation (2):

$$I_{SS} = \frac{-b + \sqrt{b^2 - 4a(c - y)}}{2a}. \tag{2}$$

Figure 14:
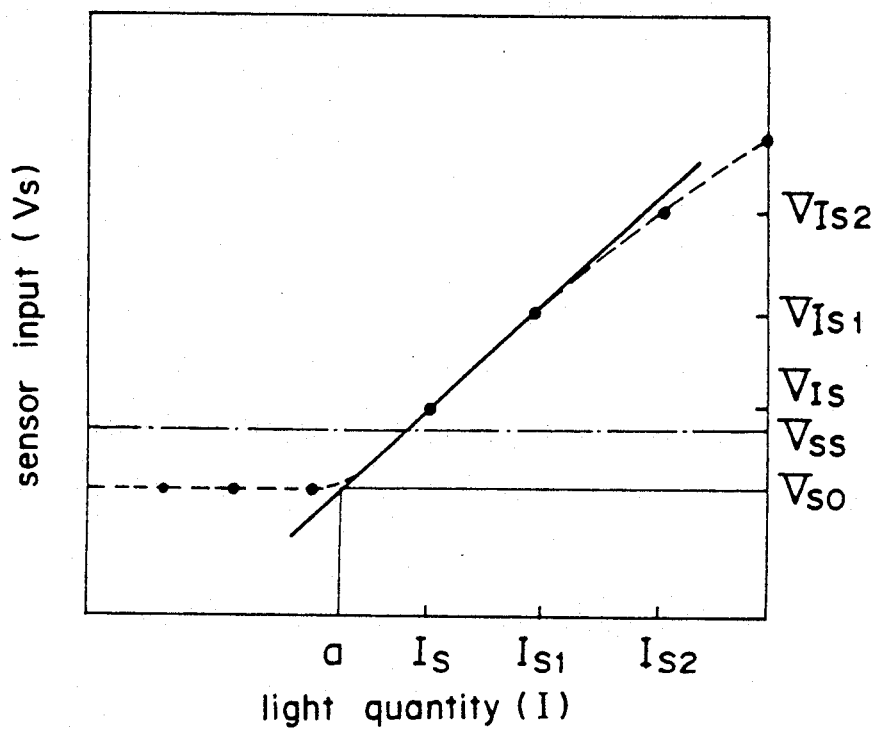
FIG. 14 is a diagram for illustrating the determination of the initial light quantity for image reproduction.

(d3-c) As shown in FIG. 14, the sensor output $V_S$ for the light quantity level $I_0$ after the sensor output exceeds the threshold level $V_{SS}$ is corrected as explained below by using the sensor outputs $V_{IS}$ and $V_{IS1}$ (and $V_{IS2}$) for the light quantity levels $I_S$ and $I_{S1}$ (and $I_{S2}$) just after the $I_0$ and by performing the linear extrapolation to the ground level $V_{S0}$ so as to determine the initial light quantity "a".

(e) automatic density control

The automatic control will be explained below in detail. This control is performed before the above-mentioned measurement of the initial light quantity. Table 2 shows an example of an AIDC table which includes combinations ($V_B$, $V_G$) of the bias voltage $V_B$ of the development unit 45a–45d and the surface potential $V_0$ on the photoconductor drum 41. Though the grid potential $V_G$ and the development voltage $V_B$ are negative in this embodiment, it is expressed as absolute values in Table 2 for simplicity. In Table 2, "detected amount of adhered toners" is the amount of adhered toners measured with the AIDC sensor 210 on the standard toner image formed in the standard image-forming conditions, and "development efficiency" is defined as a ratio of the detected amount of toners to the development voltage. Further, the development voltage $\Delta V d$ needed to realize a desired amount of adhered toners, called as prescribed development voltage, is defined as a ratio of the desired amount to the development efficiency. In this embodiment, the desired amount of adhered toners is 1 mg/cm$^2$, and Table 2 shows the prescribed development voltage $\Delta V d$ for the desired amount of adhered toners. The surface potential $V_{Im}$ denotes the potential when the photoconductor is exposed with a laser beam of an intensity in correspondence to an image of the highest density. As shown in Table 2, the detection value of the AIDC sensor 210 is classified to density detection levels (LBA) 0–11 displayed in the left-most column determined according to the amplitude of the detection value. According to the density detection level LBA, the grid potential $V_G$ is changed from 500 V to 1000 V and the development bias voltage $V_B$ is changed from 280 to 710 V.

TABLE 2

| density detection level LBA | detected amount of adhered toners [mg/cm$^2$] | development efficiency | $\Delta Vd$ [V] | $V_G$ [V] | $V_o$ [V] | $V_B$ [V] | $V_{Im}$ [V] |
| --- | --- | --- | --- | --- | --- | --- | --- |
| 0  | 0.625 | 0.00625 | 160 | 500  | 480 | 280 | 120 |
| 1  | 0.510 | 0.00510 | 195 | 540  | 520 | 320 | 125 |
| 2  | 0.455 | 0.00455 | 220 | 570  | 545 | 345 | 125 |
| 3  | 0.410 | 0.00410 | 245 | 600  | 570 | 370 | 125 |
| 4  | 0.385 | 0.00385 | 260 | 630  | 590 | 390 | 130 |
| 5  | 0.345 | 0.00345 | 290 | 660  | 620 | 420 | 130 |
| 6  | 0.310 | 0.00310 | 320 | 700  | 650 | 450 | 130 |
| 7  | 0.280 | 0.00280 | 355 | 740  | 690 | 490 | 135 |
| 8  | 0.260 | 0.00260 | 385 | 780  | 720 | 520 | 135 |
| 9  | 0.240 | 0.00240 | 420 | 830  | 760 | 560 | 140 |
| 10 | 0.210 | 0.00210 | 480 | 900  | 820 | 620 | 140 |
| 11 | 0.180 | 0.00180 | 560 | 1000 | 910 | 710 | 150 |

TABLE 3

| | | amendment code SP | | | |
| --- | --- | --- | --- | --- | --- |
| | | temperature (°C.) | | | |
| | | 10 | 18 | 25 | 32 | 40 |
| humidity | 90% | +3 | +2 | +1 | +1 | 0 |
| | 70 | +2 | +1 | 0 | 0 | −1 |
| | 50 | +2 | +1 | 0 | −1 | −2 |
| | 30 | +2 | +1 | 0 | −1 | −2 |
| | 10 | +2 | +1 | 0 | −2 | −2 |

TABLE 4

| | amendment data LLOT |
| --- | --- |
| lot rank | light quantity level (LLOT) |
| A | 2 |
| B | 3 |
| C | 4 |
| D | 5 |

The density control of the copying machine will be explained below. First, the laser diode power for exposure is determined. The amendment code SP on the laser diode power is determined according to the temperature and humidity measured with the sensors 212 and 213, as shown in Table 3. The sensor amendment code (SP) is set so as to be zero in the standard state. Further, the amendment code LLOT of laser diode power for the photoconductor lot is determined according to the input of the photoconductor lot switch 218. On the other hand, the amendment code SG is determined according to the selection with the fog key in the operational panel 221 by a user or with a DIP switch or the like by a service man or to the addition of the two selections. The laser diode power is determined according to the sum of LLOT and SG.

Then, the amount of adhered toners at a prescribed exposure light quantity is detected by the AIDC sensor 210 by forming toner images with use of the laser diode power determined as explained above. A standard toner image is formed in the image forming conditions of standard toner image ($V_G$=660 V, $V_B$=440 V, exposure level EXL=100). That is, the grid potential $V_G$ applied to the grid electrode 43G of the sensitizing charger 43 and the bias potential $V_B$ applied to the development sleeve of the development unit 45a–45d are set as the above-mentioned values. In these conditions, the surface potential $V_I$ after exposure is 300 V and the development voltage $\Delta V = |V_B - V_I| = 100$ V. Then, the photoconductor is exposed with the above-mentioned laser diode power to form an electrostatic latent image on the photoconductor, and the image is developed by the development unit 45a–45d. The amount of toners adhered to the image is detected by the AIDC sensor 210, and the detection signal is sent to the printer controller 201. The printer controller 201 determines the U toner density level LBA and refers the AIDC table (Table 1) stored in the ROM 203 to determines $V_G$, $V_B$ and the surface potential $V_{Im}$. The surface potential $V_{Im}$ denotes the potential when the photoconductor is exposed with a laser beam of an intensity in correspondence to an image of the highest density. Then, the $V_G$ generation unit 243 and the $V_B$ generation unit 244 are activated according to the determined $V_G$ and $V_B$, while the variable attenuator 266 is controlled according to the determined $V_{Im}$.

Then, the measurement of the initial light quantity as well as the image-forming for documents can be performed by using the grid potential $V_G$ and the development bias potential $V_B$ determined according to the detected signal.

(f) flow of printer control

Figure 15:
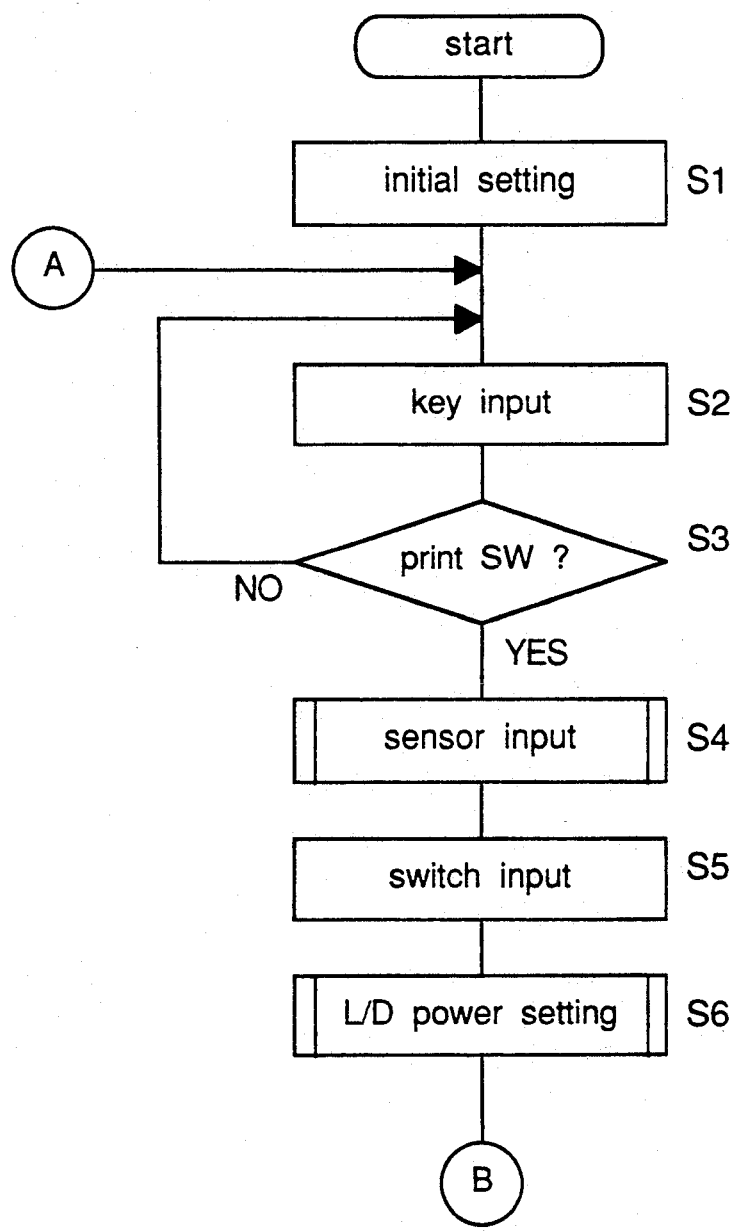
FIG. 15 is a part of a flowchart of print operation of the printer controller.
Figure 16:
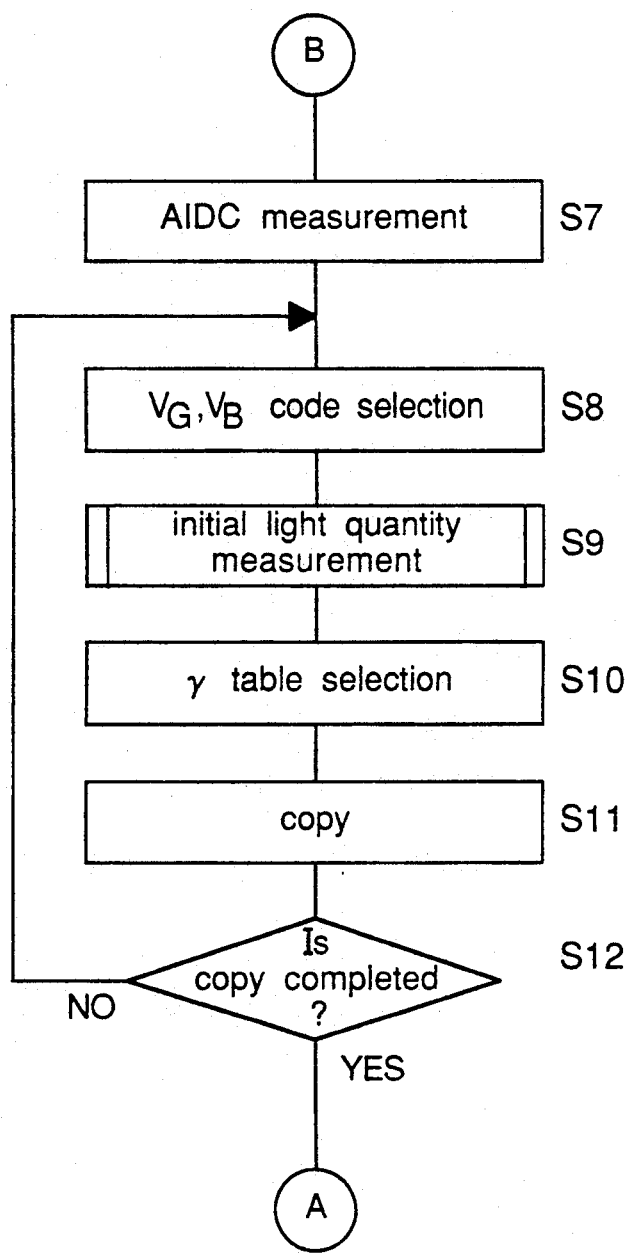
FIG. 16 is a part of the flowchart of print operation of the printer controller.

FIGS. 15 and 16 show a control flow of the printer controller 201 of the digital color copying machine.

At step S1, the initialization of the printer controller 201 is performed, and at step S2, a key input of the operational panel 221 is received. Next, at step S3, it is decided if the start key in the operational panel 221 is pressed or not. If it is decided that the start key is not pressed (NO at step S3), the flow returns to step S2 again.

Figure 17:
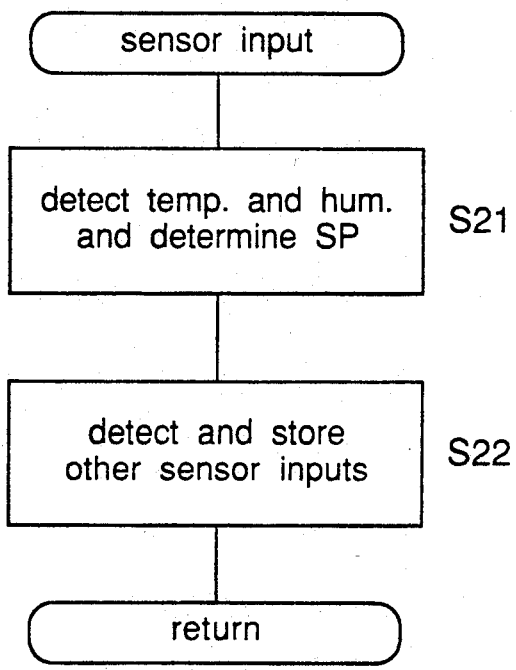
FIG. 17 is a flowchart of sensor input processing.

If it is decided at step S3 that the start key 8 is pressed, the sensor inputs are received at step S4. In this processing shown in detail in FIG. 17, first at step S21, the temperature and the humidity detected by the temperature sensor 212 and the humidity sensor 213 are received, and the photoconductor sensitivity amendment data SP is determined according to Table 4. Next, at step S42, data of other sensors are received. The results are stored in the RAM in the printer controller 201. Then, the flow returns to the main flow.

At step S5 in FIG. 15 of the switch input processing, the correction codes in correspondence to the input signal from the DIP switch and the fog switch of the operational panel 221 are also stored in the RAM.

Figure 18:
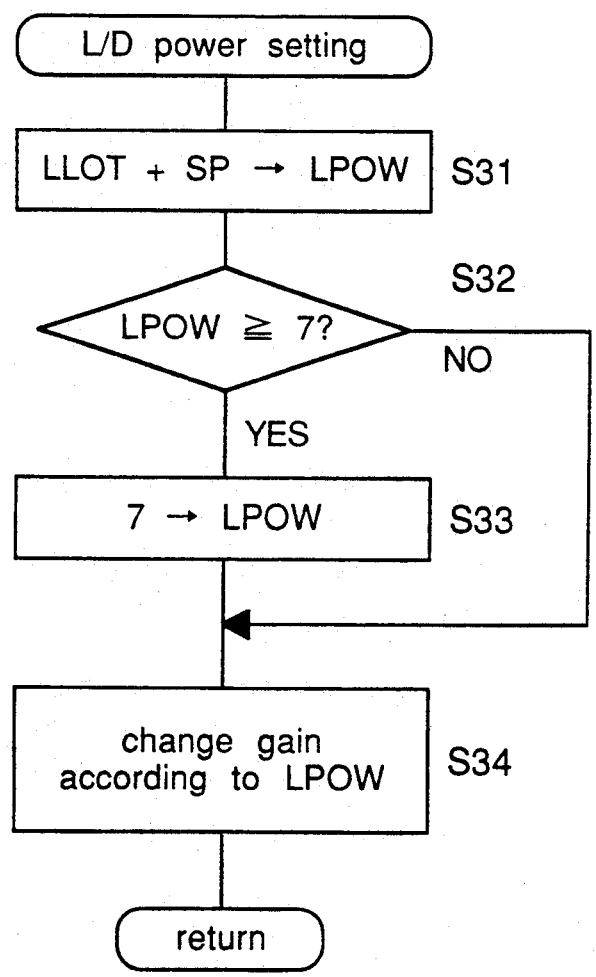
FIG. 18 is a flowchart of L/D power setting.

Then, at step S6, the power of the laser diode 264 is set. FIG. 18 shows the flow of the power setting processing in detail. First, at step 61, LLOT (photoconductor lot switch code) and SP (sensitivity amendment data) are added to obtain a 3-bit power code (LPOW). Then, if LPOW is decided to be larger than the maximum (7) at step S62, LPOW is set to be 7 at step S63. Then, at step S64, the gain of the attenuator 266 is changed according to the LPOW code, and the flow returns to the main flow.

Then, at step S7 in FIG. 15, the AIDC processing is performed. In this AIDC processing, after the grid potential $V_G$ and the bias potential $V_B$ are set as the standard values, a standard image pattern is formed and developed on the photoconductor drum 41, and the amount of adhered toners is detected with the AIDC sensor 210, and $V_G$, $V_B$ and the maximum light intensity are determined according to the density detection level LBA.

Next, at step S9, the initial light quantity "a" for image reproduction is determined, as will be explained later in detail (FIGS. 19-22).

Next, at step S10, the gamma table is selected in Table 2 according to the detected initial light quantity "a".

Next, at step S11, a known copy action is carried out by using the selected grid potential $V_G$, development bias potential $V_B$ and gamma table. This copy action is repeated for the four colors of yellow (Y), magenta (M), cyan (C) and black (K). Thus, the steps S8-S10 are carried out between the image-formings at step S11 of the four color images.

Next, when the copy (multi copy) is decided at step S12 to complete, the flow returns to step S2, otherwise the flow returns to step S8.

In cases of multi copy, the initial light quantity measurement of step S9 is performed only in a limited light quantity range around the light quantity measured in a previous time, in order to shorten the copy time. Further, the measurement may also be carried out only at the first sheet of copy.

Figure 19:
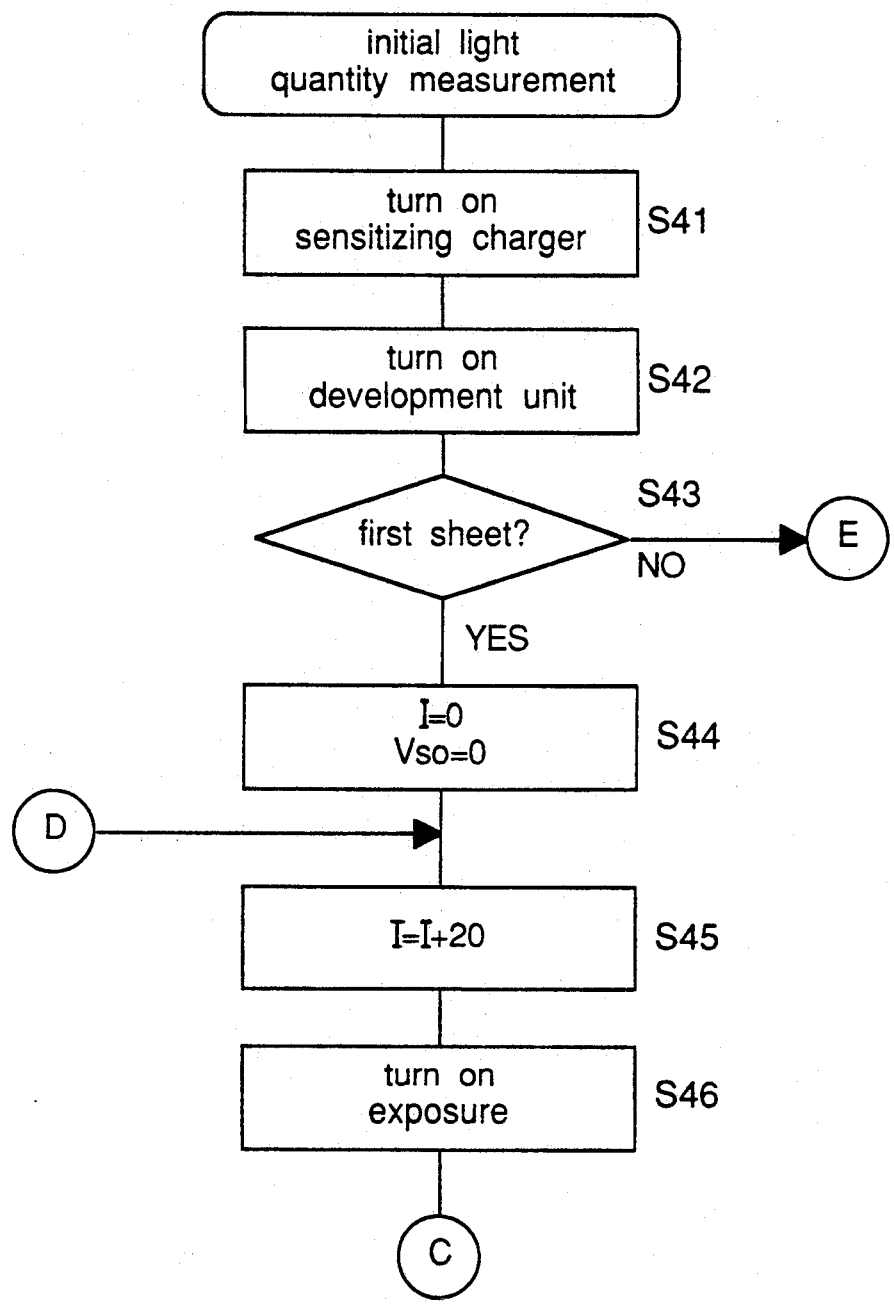
FIG. 19 is a part of a flowchart of the measurement of the initial light quantity.
Figure 20:
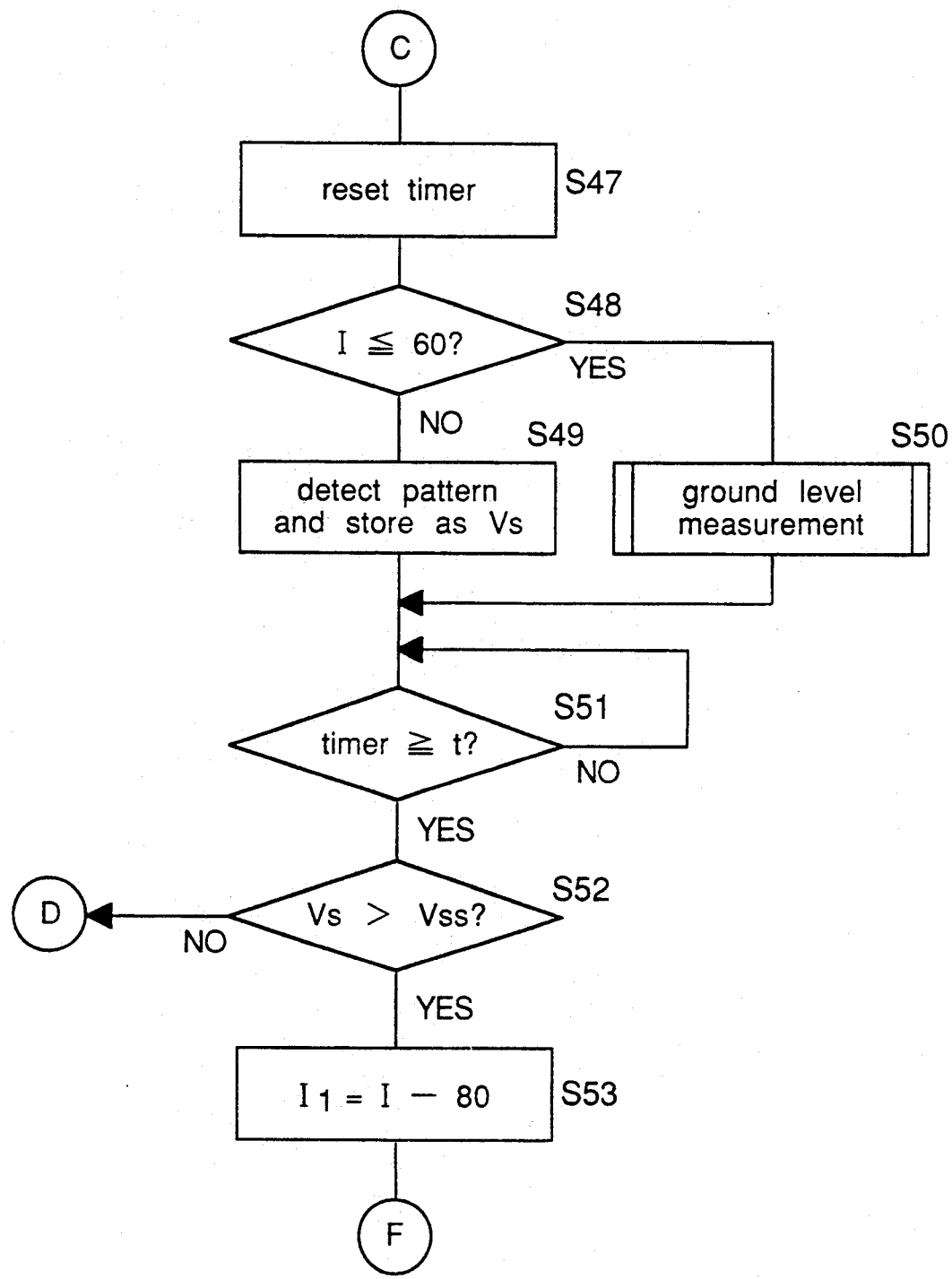
FIG. 20 is a part of the flowchart of the measurement of the initial light quantity.
Figure 21:
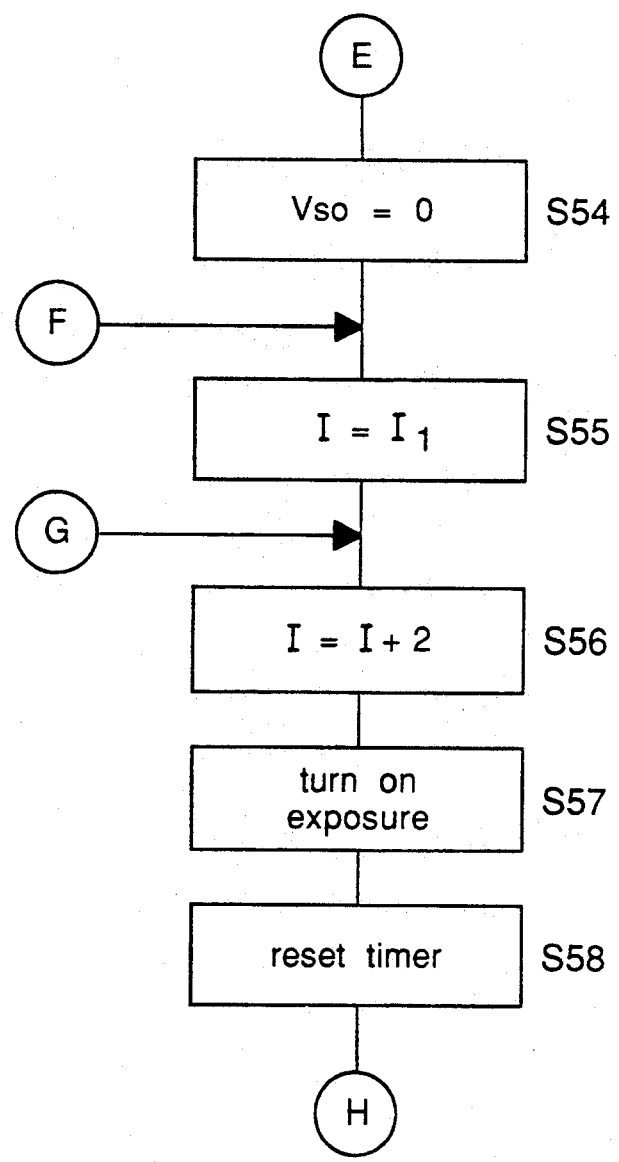
FIG. 21 is a part of the flowchart of the measurement of the initial light quantity.
Figure 22:
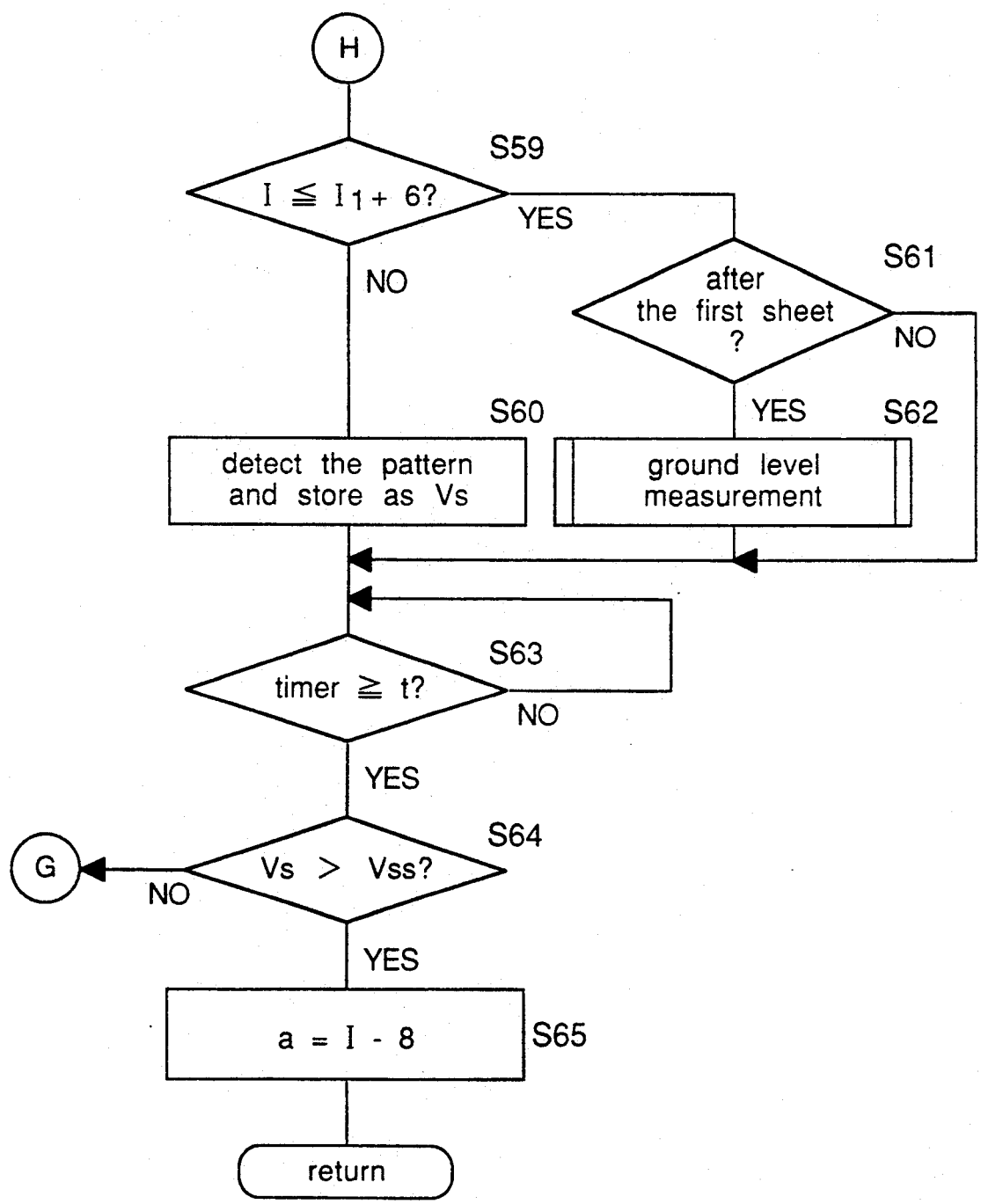
FIG. 22 is a part of the flowchart of the measurement of the initial light quantity.

Next, an example of the flow of the measurement of the initial light quantity (step S9) is explained with reference to FIGS. 19-21. In this flow, the above-mentioned procedures (d1-b), (d2-b) and (d3-a) are used. When the flow starts, the sensitizing charger 43 is activated first (step S41), and one of the development units 45a-45d is activated (step S42). Then, it is decided if a copy to be carried out is a copy of a first sheet not (step S43). If the decision is YES, the first series of exposure is carried out wherein the exposure light quantity is increased by 20 steps.

In the first series, the exposure light quantity I and the ground level $V_{S0}$ are both initialized as zero (step S44). Next, the exposure light quantity is increased by 20 (step S45), the exposure is started (step S46) and the timer for determining the interval of the patterns is reset (step S47).

Then, it is decided if the exposure light quantity is 60 or less (step S48). If the exposure light quantity is decided to be more than 60, the pattern is read with the AIDC sensor 210 to store the read level $V_S$. Otherwise the routine of the ground level measurement (step S50) is carried out wherein the ground level is measured three times with use of the time difference between the exposure and the detection.

Next, it is waited that a time "t" passes (step S51). After a time "t" is decided to pass (YES at step S51), it is further decided if the read level $V_S$ exceeds the threshold level $V_{SS}$ (step S52). If the read level $V_S$ is decided not to exceed the threshold level $V_{SS}$ (NO at step S52), the flow returns to step S45. That is, a loop from step S45 to step S52 is repeated until the read level $V_S$ exceeds the threshold level $V_{SS}$. If the read level $V_S$ is decided to exceed the threshold level $V_{SS}$ (YES at step S52), the flow proceeds to step S53 wherein the light quantity is returned to the value before the four stages for the start of the exposure in the second series because it is related to the value processed at step S52 (refer FIG. 22).

Next, the patterns of the second series are measured wherein the light quantity is increased by 2 steps successively. First, the ground level $V_{S0}$ is initialized to zero (step S54). That is, the ground level measurement is carried out again by taking changes in the characteristics into account. It is to be noted that the surface potential $V_0$ just after the sensitization before the exposure can also be taken almost equal to the grid potential $V_G$ when the exposure light quantity is at minimum. If the copy action to be carried out is decided not to be a copy of a first sheet at step S43, the flow also proceeds to step S54. Then, the light quantity I is set to be the first value $I_1$. Next, the light quantity I is increased by 2 steps (step S56). The exposure is started (step S57) and the timer for determining the interval of the patterns is reset (step S58).

Then, it is decided if the light quantity I is $I_1+6$ or less (step S59). If the decision is YES, it is decided further if the copy to be carried out is not a copy of a first sheet at step S61. If the copy is a copy of a second or further sheet, the routine of the ground level measurement (step S62) is carried out wherein the ground level is measured three times. If the decision at step S59 is NO, the pattern is read with the AIDC sensor 210 to store the read level $V_S$ (step S60).

Next, it is waited that a time "t" passes (step S63). After a time "t" passes (YES at step S63), it is decided if the read level $V_S$ exceeds the threshold level $V_{SS}$ (step S64). If the read level $V_S$ is decided not to exceed the threshold level $V_{SS}$ (NO at step S64), the flow returns to step S56. That is, a loop from step S56 to step S63 is repeated until the read level $V_S$ exceeds the threshold level $V_{SS}$. If the read level $V_S$ is decided to exceed the threshold level $V_{SS}$ (YES at step S64), the flow proceeds to step S65 wherein the initial light quantity is determined as the light quantity before four stages for the exposure in the second series because the current image is related to the light quantity before three stages.

Figure 23:
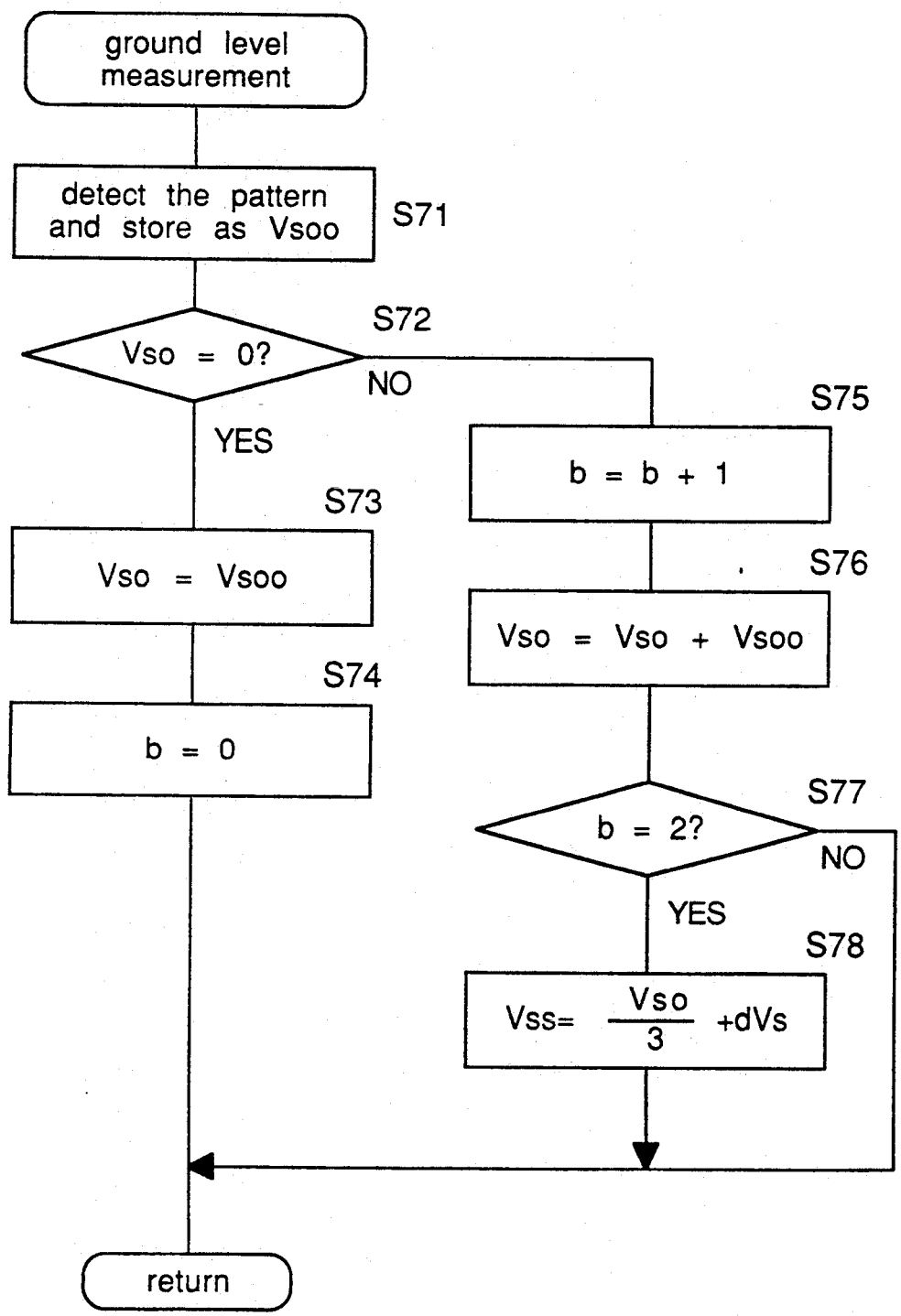
FIG. 23 is a flowchart of the background level measurement routine.

Next, the flow of the measurement of the ground level $V_{S0}$ (steps S50 and S62) is explained as shown FIG. 23. First, the pattern is detected with the AIDC sensor 210, and the detected value $V_{S00}$ is stored (step S71). Next, it is decided if the ground level $V_S$D is zero (step S72). If the decision is decided to be YES, the ground level $V_{S0}$ is set as $V_{S00}$ (step S73) and "b" is set to be zero (step S74). Otherwise "b" is increased by one (step S75) and the ground level $V_{S0}$ is increased by $V_{S00}$ (step S76). Further, if "b" is decided to be two (YES at step S78), the threshold level $V_{SS}$ is determined as $V_{S0}/3+dV_S$ from the average of the three $V_S$ values and the predetermined value $dV_S$. Then, the flow returns to the main flow.

Thus, the initial light quantity can be determined. Then, the gamma table is changed according to the initial light quantity. Thus, the reproducibility of a halftone image is not affected by the change in the initial light quantity due to process conditions.

(g) Modified embodiments

In the above-explained embodiment, the gamma table is changed according to the initial light quantity in order to compensate the change in copying processes. However, the compensation can also be performed by changing the grid potential of the sensitizing charger 43 and the bias potential $V_B$ of the development unit 45.

Figure 24:
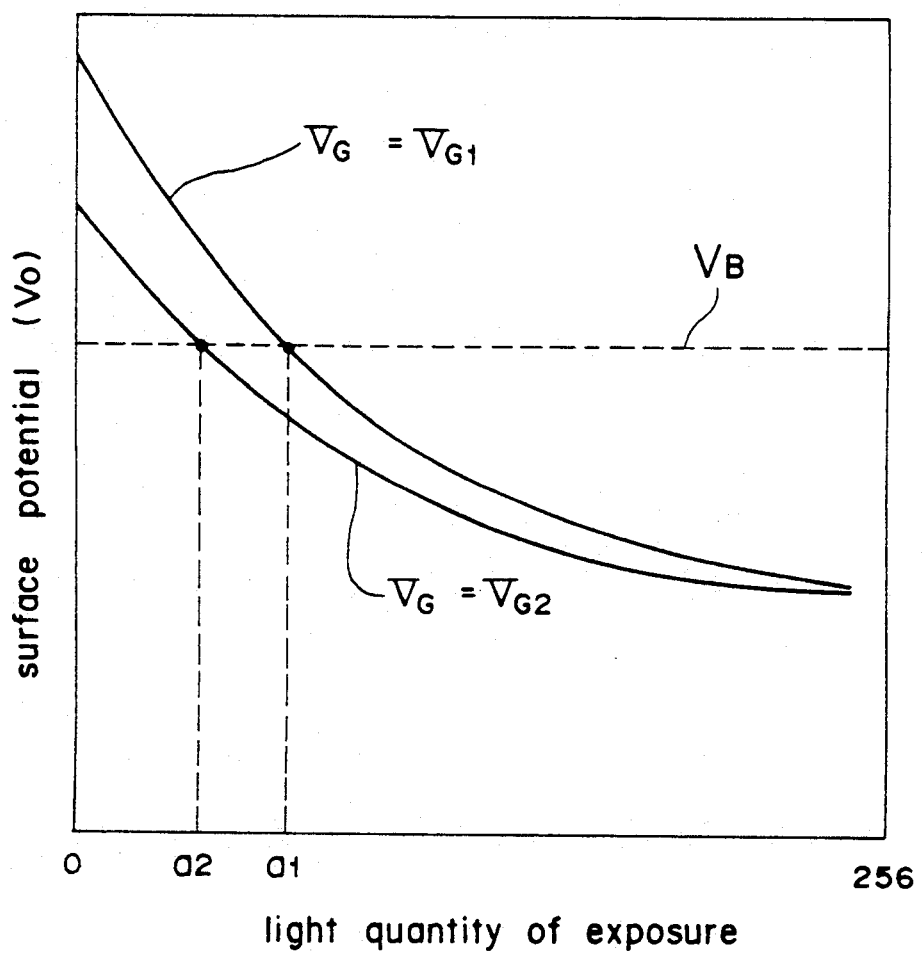
FIG. 24 is a diagram for illustrating the change of the initial light quantity for image reproduction according to the grid potential.
Figure 25:
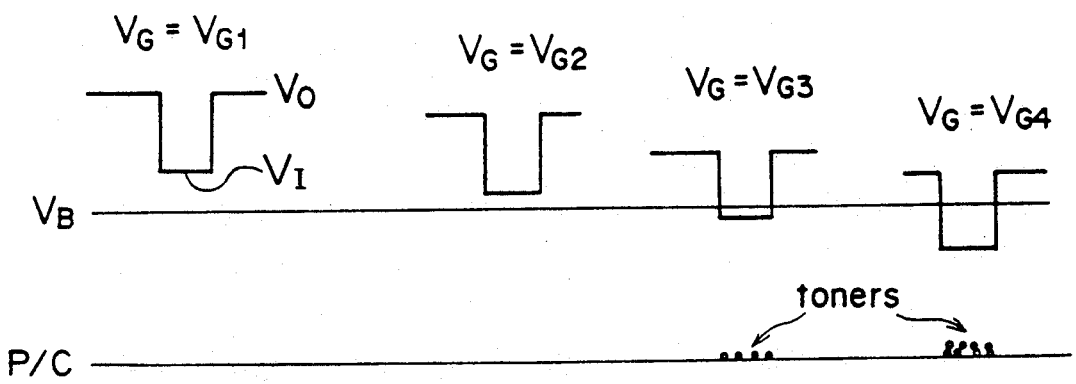
FIG. 25 is a diagram for illustrating the detection of the initial bias potential for image reproduction.
Figure 26:
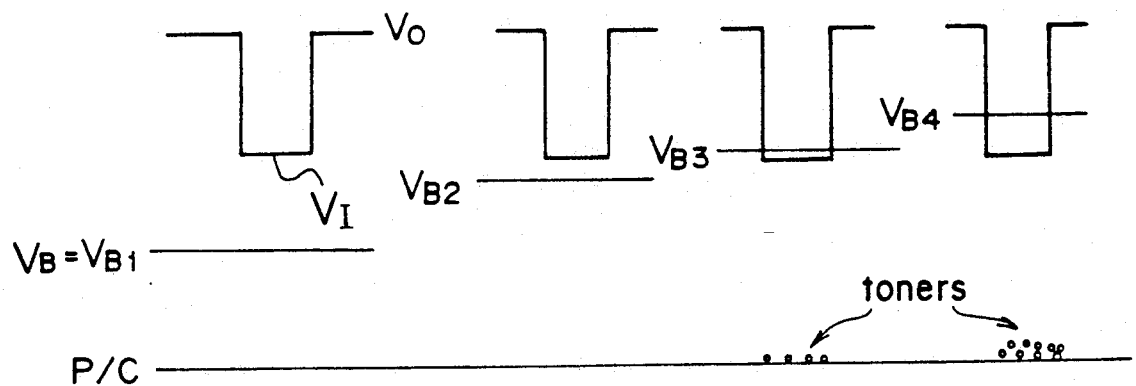
FIG. 26 is a diagram for illustrating the detection of the initial bias potential for image reproduction.

The dependence of the exposure vs. surface potential characteristic on the grid potential $V_G$ shown in FIG. 24 illustrates clearly that if the bias potential $V_B$ is constant, the initial light quantity "a" decreases from "a1" to "a2" when the grid potential $V_G$ is decreased from $V_{G1}$ to $V_{G2}$. This situation is displayed in FIG. 25 wherein the grid potential $V_G$ is deceased from $V_{G1}$ to $V_{G4}$ successively. When the attenuation potential $V_I$ becomes lower than the bias potential $V_B$, toners adhere to the exposed portion on the photoconductor (P/C). Another situation is displayed in FIG. 26 wherein the bias potential $V_B$ is increased from $V_{B1}$ to $V_{B4}$ successively. When the attenuation potential VI becomes lower than the bias potential $V_B$, toners adhere to the exposed portion on the photoconductor (P/C). Therefore, by using the above-mentioned characteristic, the changes in the copying process can be compensated, as will be explained below in detail.

A first case will be explained wherein the grid potential $V_G$ is changed for the compensation.

First, the initial light quantity "af" is provided for the standard grid potential $V_G$ and bias potential $V_B$ determined by the AIDC measurement (refer step S7 in FIG. 16).

The initial light quantity decreases with decreasing surface potential $V_0$. Then, patterns of electrostatic latent images are formed on the photoconductor drum 41 by decreasing the grid potential $V_G$ successively from a value larger than the standard grid potential under the same bias potential $V_B$ and the same light quantity of laser beam. Then, a pattern begins to be developed with toners when the grid potential decreases to a certain value $V_{GS}$.

Next, the value of the grid potential $V_G$ in the AIDC table is rewritten according to the difference between the certain grid potential $V_{GS}$ and the standard grid potential.

Another case will be explained wherein the bias potential $V_B$ of the development unit is changed for compensation.

First, the initial light quantity "af" is provided for the standard grid potential $V_G$ and bias potential $V_B$ determined by the AIDC measurement (refer step S7 in FIG. 16).

The initial light quantity decreases with increasing bias potential $V_B$. Then, patterns of electrostatic latent images are formed on the photoconductor drum 41 by increasing the bias potential $V_B$ successively from a value lower than the standard grid potential under the same grid potential $V_G$ and the same light quantity of laser beam. Then, a pattern begins to be developed with toners when the bias potential increases to a certain value $V_{BS}$.

Next, the value of the bias potential $V_B$ in the AIDC table is rewritten according to the difference between the certain bias potential $V_{BS}$ and the standard bias potential.

Further, in the present embodiment, the laser diode 264 is driven according to the intensity modulation method. However, this invention can also be applied to the pulse width modulation method wherein the gradation characteristic is also affected by the image forming-conditions because the potential of the exposed photoconductor changes at the low density region as in the intensity modulation method. However, the effect of the exposure on the photoconductor is larger for the intensity modulation method. Therefore, the present invention is more advantageous for the intensity modulation method.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image forming apparatus comprising:
   a photoconductor;
   an image forming means for forming a toner image on the photoconductor;
   a control means for setting the value of a predetermined operating parameter of the image forming means in order to control the amount of adhered toners of the toner image formed by the image forming means; and
   a detection means for detecting the amount of the adhered toners;
   wherein the control means changes the value of the operating parameter stepwise when the image forming means forms a plurality of toner images and the detection means detects the amount of the adhered toners of each toner image formed with use of the operating parameter, and the control means determines the value of the operating parameter which is used to form the toner image of the smallest amount of the adhered toners in the amounts detected by the detection means and sets the determined operating parameter of the image forming means when a document image is formed by the image forming means.

2. The image forming apparatus according to claim 1, said image forming means comprising:
   a correction means for correcting image signals of the densities of an image to be formed with use of a gamma table in correspondence to the gamma characteristic of the image forming apparatus;
   an exposure means for exposing said photoconductor at a quantity of exposure light in correspondence to the image signals corrected by the correction means to form an electrostatic latent image on said photoconductor; and
   a development means for developing the electrostatic latent image;
   wherein said operating parameter is the quantity of exposure light, and said control means determines the value of the quantity of exposure light which is used to form the toner image of the smallest amount of the adhered toners in the amounts detected by the detection means and corrects the gamma table according to the determined quantity of exposure light.

3. The image forming apparatus according to claim 1, said image forming apparatus comprising:
   a sensitizing means for sensitizing said photoconductor at a uniform initial electric potential; and
   an exposure means for exposing said photoconductor at a quantity of exposure light in correspondence to the image density of an image to be formed to form an electrostatic latent image on said photoconductor;
   wherein said operating parameter is the initial electric potential of the photoconductor and said control means determines the value of the initial electric potential which is used to form the toner image of the smallest amount of the adhered toners in the amounts detected by the detection means and controls the sensitizing means according to the determined initial electric potential.

4. The image forming apparatus according to claim 1, said image forming apparatus comprising:
   a charger comprising a discharge electrode and a grid electrode provided between the discharge electrode and said photoconductor, the charger sensitizing said photoconductor at the uniform initial electric potential in correspondence to the electric potential of the grid electrode;

an application means for applying a grid electric potential to the grid electrode;

an exposure means for exposing said photoconductor sensitized beforehand by said charger at a quantity of exposure light in correspondence to the image density of an image to be formed to form an electrostatic latent image on said photoconductor;

wherein said operating parameter is the grid electric potential and said control means determines the value of the grid potential which is used to form the toner image of the smallest amount of the adhered toners in the amounts detected by the detection means and controls said application means according to the determined grid potential.

5. The image forming apparatus according to claim 1, said image forming means comprising:

an image forming means for forming an electrostatic image on the photoconductor;

a development means for developing the electrostatic latent image; and an application means for applying a predetermined bias electric potential to the development means;

wherein said operating parameter is the bias electric potential and said control means determines the value of the bias potential which is used to form the toner image of the smallest amount of the adhered toners in the amounts detected by the detection means and controls said application means according to the determined bias potential.

6. The image forming apparatus according to claim 1, wherein said control means changes the value of the operating parameter stepwise by a first change quantity in a first series, and changes the value of the operating parameter stepwise by a second change quantity smaller than the first change quantity in a second series.

7. An image forming apparatus comprising:
a photoconductor;
a sensitizing means for sensitizing said photoconductor at a uniform initial electric potential;
a correction means for correcting image signals of the densities of an image to be formed with use of a gamma table in correspondence to the gamma characteristic of the image forming apparatus;
an exposure means for exposing said photoconductor at a light intensity of laser beam in correspondence to the image signals corrected by the correction means to form an electrostatic latent image on said photoconductor;
a development means for developing the electrostatic latent image;
an application means for applying a predetermined bias electric potential to the development means;
a detection means for detecting the amount of the adhered toners; and
a control means for controlling the exposure means so as to change the value of the light intensity of laser beam stepwise, which control means determining the value of the smallest light intensity which forms a toner image of the smallest amount of the adhered toners in the amounts detected by the detection means and correcting the gamma table according to the smallest light quantity.

8. An image forming apparatus comprising:
a photoconductor;
a sensitizing means for sensitizing said photoconductor at a uniform initial electric potential;
a correction means for correcting image signals of the densities of an image to be formed with use of a gamma table in correspondence to the gamma characteristic of the image forming apparatus;

an exposure means for exposing said photoconductor at a light intensity of laser beam in correspondence to the image signals corrected by the correction means to form an electrostatic latent image on said photoconductor; and a development means for developing the electrostatic latent image with toners;

an application means for applying a predetermined bias electric potential to the development means;

a detection means for detecting the amount of the adhered toners; and a control means for controlling the application means and the exposure means so as to change the initial electric potential stepwise under a constant light intensity of laser beam, the control means determining the value of the largest initial electric potential which can adhere toners on the photoconductor based on the values detected by the detection means and sets the initial electric potential in the sensitizing means as the initial electric potential.

9. An image forming apparatus comprising:
a photoconductor;
a sensitizing means for sensitizing said photoconductor at a constant initial electric potential;
a correction means for correcting image signals of the densities of an image to be formed with use of a gamma table in correspondence to the gamma characteristic of the image forming apparatus;
an exposure means for exposing said photoconductor at a light intensity of laser beam in correspondence to the image signals corrected by the correction means to form an electrostatic latent image on said photoconductor; and
a development means for developing the electrostatic latent image with toners;
an application means for applying a bias electric potential to the development means;
a detection means for detecting the amount of the adhered toners; and
a control means for controlling the application means and the exposure means so as to change the bias electric potential stepwise under a constant light intensity of laser beam, the control means determining the value of the smallest bias electric potential for adhering toners on the photoconductor based on the values detected by the detection means and sets the smallest bias electric potential in the application means as the determined bias electric potential.

10. A method for controlling the image density for an image forming apparatus wherein the image signals of the densities of an image to be formed are corrected with use of a gamma table in correspondence to the gamma characteristic of the image forming apparatus, a photoconductor is exposed with a laser beam at an intensity in accordance to the corrected image signals to form an electrostatic latent image, and the electrostatic latent image is developed with toners to form an toner image; the method comprising the steps of:

sensitizing the photoconductor at a constant initial electric potential;

exposing the photoconductor with the laser beam by changing the light intensity of the laser beam stepwise;

developing the exposed photoconductor to form a toner image with toners;

detecting the amounts of adhered toners of the toner images;

determining the smallest light intensity for adhering toners on the photoconductor based on the detected values; and rewriting the gamma table according to the determined light intensity.

11. A method for controlling the image density for an image forming apparatus wherein the image signals of the densities of an image to be formed are corrected with use of a gamma table in correspondence to the gamma characteristic of the image forming apparatus, a photoconductor is exposed with a laser beam at an intensity in accordance to the corrected image signals to form an electrostatic latent image, and the electrostatic latent image is developed with toners to form an toner image; the method comprising the steps of:

sensitizing the photoconductor at a uniform initial electric potential;

exposing the photoconductor with the laser beam by changing the light intensity of the laser beam stepwise by a first change quantity;

developing the exposed photoconductor to form a toner image with toners;

detecting the amount of adhered toners of the toner images;

determining the first smallest light intensity which can adhere toners on the photoconductor based on the detected amounts of adhered toners;

exposing the photoconductor with the laser beam by changing the light intensity of the laser beam stepwise at a second change quantity smaller than the first change quantity in an light intensity range determined from the first smallest light intensity;

developing the exposed photoconductor to form toner images;

detecting the amount of adhered toners of the toner images;

determining the second smallest light intensity for adhering toners on the photoconductor based on the detected values; and changing the content of the gamma table according to the second smallest light intensity.

12. A method for controlling the image density for an image forming apparatus including a photoconductor, a sensitizing means for sensitizing the photoconductor at a uniform initial electric potential, a correction means for correcting image signals of the densities of an image to be formed with use of a gamma table in correspondence to the gamma characteristic of the image forming apparatus, an exposure means for exposing the photoconductor at a light intensity in correspondence to the image signals corrected by the correction means to form an electrostatic latent image on the photoconductor, a development means for developing the electrostatic latent image with toners, and an application means for applying a predetermined bias electric potential to the development means; the method comprising the steps of:

sensitizing the photoconductor at a predetermined standard initial electric potential by the sensitizing means;

exposing the sensitized photoconductor with the laser beam at a predetermined light intensity of the laser beam;

developing the exposed photoconductor to form a toner image by the development means to which a standard bias electric potential is applied;

detecting the amount of toners adhered to the toner image;

determining the initial electric potential and/or the bias electric potential based on the detected amount of toners;

controlling the sensitizing means and/or the application means to set the initial electric potential and/or the bias electric potential as the determined values;

exposing the photoconductor by the exposure means at light intensities changed stepwise;

developing the photoconductor exposed at different light intensities with toners;

detecting the amount of adhered toners of the toner images each in correspondence to the light intensity;

determining the smallest light intensity for adhering toners on the photoconductor; and rewriting the content of the gamma table according to the determined smallest light intensity.

* * * * *